United States Patent
Ngo et al.

(10) Patent No.: US 11,563,802 B2
(45) Date of Patent: Jan. 24, 2023

(54) SYSTEMS AND METHODS FOR HIERARCHICAL FAILOVER GROUPS

(71) Applicant: DH2i COMPANY, Fort Collins, CO (US)

(72) Inventors: Thanh Q. Ngo, Oregon, OR (US); Samuel Revitch, Portland, OR (US)

(73) Assignee: DH2I COMPANY, Fort Collings, CO (US)

(*) Notice: Subject to any disclaimer, the term of this patent is extended or adjusted under 35 U.S.C. 154(b) by 0 days.

(21) Appl. No.: 17/453,407

(22) Filed: Nov. 3, 2021

(65) Prior Publication Data
US 2022/0150302 A1    May 12, 2022

Related U.S. Application Data

(60) Provisional application No. 63/110,481, filed on Nov. 6, 2020.

(51) Int. Cl.
*H04L 67/1008* (2022.01)
*H04L 67/101* (2022.01)
*H04L 41/0663* (2022.01)
*G06F 9/455* (2018.01)
*H04L 41/0604* (2022.01)

(52) U.S. Cl.
CPC ...... *H04L 67/1008* (2013.01); *G06F 9/45558* (2013.01); *H04L 41/0627* (2013.01); *H04L 41/0663* (2013.01); *H04L 67/101* (2013.01); *G06F 2009/45595* (2013.01)

(58) Field of Classification Search
CPC ............. H04L 41/0627; H04L 41/0663; H04L 67/1008; H04L 67/101; G06F 2009/45595
See application file for complete search history.

(56) References Cited

U.S. PATENT DOCUMENTS

| | | | |
|---|---|---|---|
| 7,992,201 B2 | 8/2011 | Aldridge | |
| 8,020,203 B2 | 9/2011 | Kumar | |
| 8,234,702 B2 | 7/2012 | Maes | |
| 8,843,639 B2 | 9/2014 | Jewell | |
| 8,959,523 B2* | 2/2015 | Patil | G06F 9/5066 |
| | | | 718/1 |
| 8,990,901 B2 | 3/2015 | Aravindakshan | |
| 9,037,709 B2 | 5/2015 | Enns | |

(Continued)

FOREIGN PATENT DOCUMENTS

| | | |
|---|---|---|
| EP | 3198464 A1 | 3/2016 |
| WO | 2016049609 A1 | 3/2016 |

OTHER PUBLICATIONS

Li et al., "Comparing Containers versus Virtual Machines for Achieving High Availability", 2015 IEEE International Conference on Cloud Engieering, Mar. 8, 2015.*

(Continued)

*Primary Examiner* — Todd L Barker
(74) *Attorney, Agent, or Firm* — Martensen IP; Michael C. Martensen

(57) ABSTRACT

A logical grouping of subgroups of server clusters forms a failover super-cluster. A logical grouping of groups of servers provides high availability by, upon failure of an entire group (site), failing over an entire subgroup to a different subgroup. Yet within each subgroup local failovers continue to maintain application high availability during instances in which the site remains operational.

20 Claims, 14 Drawing Sheets

(56) References Cited

U.S. PATENT DOCUMENTS

| | | |
|---|---|---|
| 9,215,131 B2 | 12/2015 | Frey |
| 9,241,044 B2 | 1/2016 | Shribman |
| 9,270,449 B1 | 2/2016 | Tribble |
| 9,342,293 B2 | 5/2016 | Enns |
| 9,467,454 B2 | 10/2016 | Aravindakshan |
| 9,577,909 B2 | 2/2017 | Li |
| 9,577,927 B2 | 2/2017 | Hira |
| 9,661,005 B2 | 5/2017 | Kamble |
| 9,906,497 B2 | 2/2018 | Glazemakers |
| 10,027,687 B2 | 7/2018 | Kamble |
| 10,038,669 B2 | 7/2018 | Kizu |
| 10,348,767 B1 | 7/2019 | Lee |
| 10,382,401 B1 | 8/2019 | Lee |
| 10,397,189 B1 | 8/2019 | Hashmi |
| 10,412,048 B2 | 9/2019 | Glazemakers |
| 10,679,039 B2 | 6/2020 | Gallagher |
| 10,754,677 B2 * | 8/2020 | Caro Estevez ..... G06F 16/2246 |
| 11,431,553 B2 * | 8/2022 | Goodman ........... H04L 41/0668 |
| 2003/0088698 A1 | 5/2003 | Singh |
| 2004/0088385 A1 | 5/2004 | Blanchet |
| 2005/0000241 A1 | 1/2005 | Sagfors |
| 2005/0163061 A1 | 7/2005 | Piercey |
| 2006/0029016 A1 | 2/2006 | Peles |
| 2006/0235939 A1 | 10/2006 | Yim |
| 2006/0245373 A1 | 11/2006 | Bajic |
| 2006/0268834 A1 | 11/2006 | Bajic |
| 2007/0002833 A1 | 1/2007 | Bajic |
| 2008/0045267 A1 | 2/2008 | Hind |
| 2008/0072307 A1 | 3/2008 | Maes |
| 2008/0144625 A1 | 6/2008 | Wu |
| 2008/0291928 A1 | 11/2008 | Tadimeti |
| 2008/0301799 A1 | 12/2008 | Arnold |
| 2009/0040926 A1 | 2/2009 | Li |
| 2009/0122990 A1 | 5/2009 | Gundavelli |
| 2009/0138611 A1 | 5/2009 | Miao et al. |
| 2009/0287955 A1 | 11/2009 | Matsumoto |
| 2010/0125903 A1 | 5/2010 | Devarajan |
| 2010/0161960 A1 | 6/2010 | Sadasivan |
| 2010/0246545 A1 | 9/2010 | Berzin |
| 2011/0082941 A1 | 4/2011 | Kim |
| 2011/0082997 A1 * | 4/2011 | Yochai ................. G06F 3/0605 711/E12.001 |
| 2011/0153793 A1 | 6/2011 | Tan |
| 2011/0202610 A1 | 8/2011 | Chaturvedi |
| 2012/0162445 A1 | 6/2012 | Kim |
| 2012/0166593 A1 | 6/2012 | Yoon et al. |
| 2012/0226820 A1 | 9/2012 | Li |
| 2013/0133043 A1 | 5/2013 | Barkie |
| 2013/0204988 A1 | 8/2013 | Grewal |
| 2013/0283364 A1 | 10/2013 | Chang |
| 2013/0298201 A1 | 11/2013 | Aravindakshan |
| 2014/0200013 A1 | 7/2014 | Enns |
| 2014/0207854 A1 | 7/2014 | Enns |
| 2014/0269774 A1 | 9/2014 | Callard |
| 2015/0026262 A1 | 1/2015 | Chaturvedi et al. |
| 2015/0188949 A1 | 7/2015 | Mahaffey |
| 2015/0195293 A1 | 7/2015 | Kamble |
| 2015/0195684 A1 | 7/2015 | Lohmar |
| 2015/0229649 A1 | 8/2015 | Aravindakshan |
| 2015/0381484 A1 | 12/2015 | Hira |
| 2016/0337104 A1 | 11/2016 | Kalligudd |
| 2017/0006034 A1 | 1/2017 | Link, II |
| 2017/0134399 A1 | 5/2017 | Kamble |
| 2017/0149548 A1 | 5/2017 | Hira |
| 2017/0223063 A1 | 8/2017 | Herrero |
| 2017/0237708 A1 | 8/2017 | Klaghofer |
| 2018/0026811 A1 | 1/2018 | Herrero |
| 2018/0054388 A1 | 2/2018 | Herrero |
| 2018/0077267 A1 | 3/2018 | Bayer |
| 2019/0089557 A1 | 3/2019 | Sung |
| 2019/0182155 A1 | 6/2019 | Chang |
| 2019/0342095 A1 * | 11/2019 | Simons ..................... H04L 9/50 |
| 2020/0034173 A1 * | 1/2020 | Rosenberg ............ G06F 9/5077 |

OTHER PUBLICATIONS

Zhou et al., "VMCTune: A Load Balancing scheme for Virtual Machine Cluster Using Dynamic Resource Allocation", 2010 Ninth International Conference on Grid and Cloud Computing, Nov. 1, 2010.*

Tschofenig, H., et al., "Transport Layer Security (TLS) / Datagram Transport Layer Security (DTLS) Profiles for the Internet of Things," Internet Engineering Task Force (IETF); ISSN 2070-1721; Jul. 2016; http://www.rfc-editor.org/info/rfc7925.

PCT/US2019/045425; International Search Report and Written Opinion of the International Searching Authority; dated Oct. 24, 2019.

PCT/US2019/045431; International Search Report and the Written Opinion of the International Searching Authority; dated Oct. 28, 2019.

Reardon, Joel, et al.; "Improving Tor using a TCP-over-DTLS Tunnel"; May 25, 2009; http://www.cypherpunks.ca/~iang/pubs/TorTP.pdf (15 pages).

PCT/US2019/045430; International Search Report and Written Opinion of the International Searching Authority; dated Oct. 24, 2019.

PCT/US2019/048355; International Search Report and the Written Opinion of the International Searching Authority; dated Oct. 28, 2019.

Tan, J., et al.; "Optimiing Tunneled Grid Connectivity Across Firewalls"; CRPIT vol. 99, Grid Computing and e-Research 2009; Proc. 7th Australasian Symposium on Grid Computing and e-Research (AusGrid 2009), Wellington, New Zealand; pp. 21-28.

PCT/US2019/045425; International Preliminary Reporton Patentability; The International Bureau of WIPO; dated Feb. 18, 2021.

PCT/US2019/045430; International Preliminary Reporton Patentability; The International Bureau of WIPO; dated Feb. 18, 2021.

PCT/US2019/045431; International Preliminary Reporton Patentability; The International Bureau of WIPO; dated Feb. 18, 2021.

PCT/US2019/048355; International Preliminary Reporton Patentability; The International Bureau of WIPO; dated Mar. 11, 2021.

"DH2i Launches DxOdessey for IoT, Edge-Optimized Software Defined Perimeter (SDP) Solution", Oct. 6, 2020 https://www.prnewswire.com/news-releases/dh2i-launches-dxodyssey-for-iot-edge-optimized-software-defined-perimeter-sdp-solution-301145871.html.

* cited by examiner

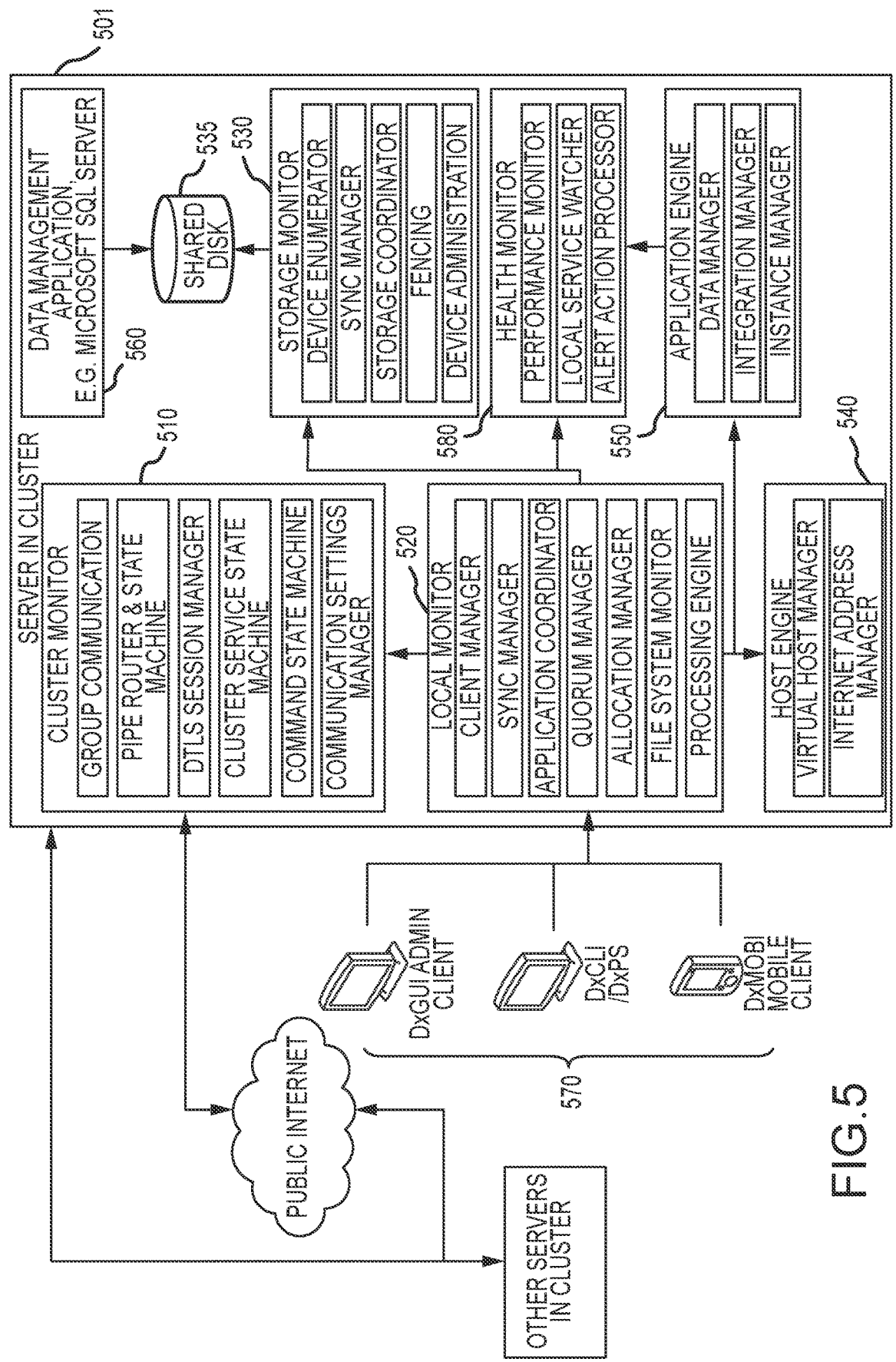

SYSTEMS AND METHODS FOR HIERARCHICAL FAILOVER GROUPS

RELATED APPLICATION

The present application relates to and claims the benefit of priority to U.S. Provisional Patent Application No. 63/110,481 filed 6 Nov. 2020 which is hereby incorporated by reference in its entirety for all purposes as if fully set forth herein.

BACKGROUND OF THE INVENTION

Field of the Invention

Embodiments of the present invention relate, in general, to server cluster failover and more particularly to subgroup failover within a logical super-cluster.

Relevant Background

A server cluster is a group of at least two independent computers (servers) connected by a network and managed as a single system to provide high availability of services for clients. Server clusters include the ability for administrators to inspect the status of cluster resources, and accordingly balance workloads among different servers in the cluster to improve performance. Such manageability also provides administrators with the ability to update one server in a cluster without taking important data and applications offline. As can be appreciated, server clusters are used in critical database management, file and intranet data sharing, messaging, general business applications, and the like.

Server clusters come in all shapes and sizes, but they are generally either asymmetric clusters or symmetric clusters. In an asymmetric cluster, a standby server exits only to take over for another server in the event of failure. This type of cluster provides high availability and reliability of services but does so at the cost of having redundant and unused capability. The standby server performs no useful work and is either as capable or more capable than the primary server. In a symmetric server cluster, every server in the cluster preforms some useful work and each server in the cluster is the primary host for a particular set of applications. If a server fails, the remaining servers continue to process the assigned set of applications as well as picking up new applications from the failed server. Symmetric server clusters are more cost effective but, in the event of a failure, the additional load on the working servers can make them fail as well, leading to the possibility of a cascading failure.

On each server in a symmetric cluster, there is one or more instantiations of various applications. Underlying each of these applications is a database engine such as Microsoft Transacted Structured Query Language or T-SQL (commonly known as SQL server). T-SQL is a special purpose programming language designed for managing data in relational database management systems. Originally built on relational algebra and tuple relational calculus, its scope includes data insert, query, update and delete functionality, schema creation and modification, and data access control. Other relational alternatives to SQL include .QL, 4D Query Language, Datalog, URL based query method, IBM Business Systems 12, ISBL, JPQL, Object Query Language, UnQL, QBE, and the like.

As mentioned, cluster computing relies on centralized management that enables the nodes to be orchestrated as shared servers. Cluster systems are commonly used in web-service support (web servers) or computation intensive applications that involve scientific calculations such as computational fluid dynamics or computer aided design renderings. In each case, the "load-balancing" is performed to manage the workshare to achieve better performance and availability. In most instances, servers within a cluster are resident at the same site.

Highly available computer clusters (failover clusters) are used to improve the reliability of the cluster approach. This is true for both symmetric and asymmetric clusters. In such architecture, redundant nodes, or nodes that are not fully utilized, exist that can accept a task from a node or component that fails. High availability clusters attempt to prevent single point failures. As one of reasonable skill in the relevant art can appreciate, the establishment, configuration, and management of such clusters is not trivial. A significant vulnerability to a highly available computer cluster is a site failure in which both the primary and secondary servers fail. Even with multiple redundant nodes if the entire site fails local failover is ineffective. For example, if a physical facility is destroyed or all lines of communication are breached the ability of the cluster to provide seamless availability is foiled. There are many reasons to have site commonality, but each come with inherent risk.

Recall that in a typical system, each computer utilizes identical operating systems, often operating on the same hardware, and possesses local memory and disk space storage. But a local network may also have access to a shared file server system that stores data pertinent to each node as needed. A cluster file system or shared file system enables members of a server cluster to work with the same data files at the same time. These files are stored on one or more storage disks that are commonly assessable by each node in the local server cluster. Yet, if the sit fails so too does access to the stored data.

As one of reasonable skill in the relevant art will appreciate, the description above is rudimentary and there are multiple variations and adaptations to the architecture presented above. A key feature of the system described above, however, is that all the applications running on an operating system use the same file system. By doing so, the file system guarantees data consistency. For example, if File ABC is found in, among others, block 1234, File DEF will not be allocated to block 1234 to store additional data unless File ABC is deleted and the blocks 1234 are released. This feature of a common or shared file system becomes problematic when an entire cluster site fails.

Applications can also operate in a virtual environment that is created on top of one or more nodes using the same approach to access data. One of reasonable skill in the relevant art will recognize that virtualization, broadly defined, is the simulation of the software and/or hardware upon which other software runs. This simulated environment is often called a virtual machine ("VM"). A virtual machine is thus a simulation of a machine (abstract or real) that is usually different from the target (real) machine (where it is being simulated on). Virtual machines may be based on specifications of a hypothetical computer or they can emulate the computer architecture and functions of a real-world computer. There are many forms of virtualization, distinguished primarily by the computing architecture layer, and virtualized components, which may include hardware platforms, operating systems, storage devices, network devices, or other resources.

Application or process virtualization includes autonomic computing. Autonomic computing is a scenario in which the computing environment can manage itself based on perceived activity. The usual goal of application or process virtualization is to centralize administrative tasks while improving scalability and overall hardware-resource utilization. This type of parallelism tends to reduce overhead costs and it differs from multitasking, which involves running several programs on the same operating system. In the same vein, hardware virtualization or platform virtualization refers to the creation of a virtual machine that acts like a real computer with an operating system. Software executed on these virtual machines is separated from the underlying hardware resources. For example, a computer that is running Microsoft Windows may host a virtual machine that looks like a computer with the Ubuntu Linux operating system. In hardware virtualization, the host machine is the actual machine on which the virtualization takes place, and the guest machine is the virtual machine. The words "host" and "guest" are used to distinguish the software that runs on the physical machine from the software that runs on the virtual machine. The software or firmware that creates a virtual machine on the host hardware is sometimes called a "hypervisor."

To provide the virtualization stack described above, a shared storage scheme is typically required. One suitable approach to shared storage is a disk or set of disks that are access-coordinated to the servers participating in a cluster. One such system is Microsoft Cluster Service or MSCS. Microsoft Cluster Service requires strict adherence to a Hardware Compatibility List ("HCL") that demands each server possess the same edition and version of the operating system and licensing requirements (i.e. SQL Server Enterprise vs. SQL Server Standard). However, the complex implementation and licensing cost to such systems can be a major roadblock for most enterprises.

Despites the advantages of application virtualization and high availability, site failure remains a concern. What is needed, therefore, is a system that enables application virtualization and failover of an entire cluster site while still maintaining the ability to address failover of an individual server within the site. These and other deficiencies of the prior art are addressed by one or more embodiments of the present invention. Additional advantages and novel features of this invention shall be set forth in part in the description that follows, and in part will become apparent to those skilled in the art upon examination of the following specification or may be learned by the practice of the invention.

SUMMARY OF THE INVENTION

A logical grouping of subgroups of server clusters forms a failover super-cluster. High-availability failover clusters typically consists of a set of servers. The present invention forms a logical grouping of groups of servers wherein the failure of a subgroup fails over to a different subgroup. Yet within each subgroup local failovers continue maintaining application high availability during instances in which the site remains operational. A failover subgroup is a virtual host on top of a subset of servers. Each subgroup (virtual host) includes one or more distinct IP addresses and one or more shared storage devices. Within each failover group is an active server which claims access to a storage media possessing necessary data to run the application should a failover occur. Other servers remain in an inactive, standby state although they too may act as an active server with respect to a different application. If the active server within the failover group is detected to have failed or becomes unable to host the application, another server within the failover group will be automatically selected to take over as the active server, will assume access to the shared storage, and will start the application.

In addition, a virtual host operates on top of a primary group of servers. It too includes one or more distinct IP addresses and one or more shared storage devices and is primarily responsible for the running of an application. Within the primary group of servers is a primary server on which the application instantiation resides. And, as with the failover group, other servers within the primary group serve as failover options should a local failure of the primary server occur. Note that the local active server and the subgroup primary server may be one in the same or be distinct servers. An extended virtual host operates on top of both the primary and the failover cluster and assembles the subgroups into a logical super-cluster.

Instead of servers solely acting as members of a server cluster, the logical super-cluster of the present invention has failover groups as members. The active server of each member group (subgroup) typically represents its subgroup in the super-cluster. One subgroup is chosen as the primary subgroup, and the same monitoring and automated failover actions are applied to the super-cluster, in the sense that if the primary subgroup completely fails, another subgroup will be automatically chosen as the active subgroup, ensuring high availability without site failure risk.

A super-cluster, according to one embodiment of the present invention, is a logical grouping of servers. As a system for high server cluster availability, a super cluster includes a plurality of computing devices communicatively connected via a network wherein at least one of the computing devices includes instructions stored on a storage medium and a processor to execute the instructions to form a virtual computing device. The plurality of computing devices and the virtual computing device are a plurality of server. In one instance of the present invention the plurality of servers includes one or more virtual hosts configured to operate on top of the plurality of servers as a logical instance container free of an operating system. Each one of the one or more virtual hosts is tied to at least one virtual internet protocol address distinct from the internet protocol address of one of the plurality of servers on which it operates.

The super-cluster further includes an extended virtual host configured to operate on top of the one or more virtual hosts wherein the extended virtual host instantiates and is tied to at least one virtual internet protocol address distinct from the internet protocol address of each virtual host. At least one instantiation of an application role is configured to operate on top of one of the one or more virtual hosts. When failover of one of the one or more virtual hosts occurs, the extended virtual host selects a different virtual host of the one or more virtual hosts and a new primary server and transfers its virtual internet protocol address and the application role to the new primary server of that virtual host.

When a local failover of a server occurs under one of the one or more virtual hosts the host engine of that server transfers its virtual internet protocol address and the instantiation role of the application from that server under the one of the one or more virtual hosts to another server under the one of the one or more virtual hosts. In a super-cluster configuration, the virtual hosts of the subgroups are each logical members of an extended virtual host and the extended virtual host recognizes each of the one or more virtual hosts as single nodes. Moreover, each virtual host includes a data store and the data on the data store is replicated across each virtual host under the extended virtual host.

In another embodiment a method for high server cluster availability includes forming one or more virtual hosts wherein each virtual host operates on top of a plurality of servers, the plurality of servers comprised of a plurality of computing devices communicatively connected via a network. The computing devices include instructions stored on a storage medium and a processor to execute the instructions to form a virtual computing device. Each of the one or more virtual hosts operates as a logical instance container free of an operating system and wherein each one of the one or more virtual hosts is tied to at least one virtual internet protocol address distinct from the internet protocol address of one of the plurality of servers on which it operates. The method continues by operating an extended virtual host on top of the one or more virtual hosts. The extended virtual host instantiates and is tied to at least one virtual internet protocol address distinct from the internet protocol address of each virtual host. Responsive to failover of one of the one or more virtual hosts, the extended virtual host selects a different virtual host of the one or more virtual hosts as a new primary server and transfers its virtual internet protocol address and application role to the new primary server of that virtual host.

The features and advantages described in this disclosure and in the following detailed description are not all-inclusive. Many additional features and advantages will be apparent to one of ordinary skill in the relevant art in view of the drawings, specification, and claims hereof. Moreover, it should be noted that the language used in the specification has been principally selected for readability and instructional purposes and may not have been selected to delineate or circumscribe the inventive subject matter; reference to the claims is necessary to determine such inventive subject matter.

BRIEF DESCRIPTION OF THE DRAWINGS

The aforementioned and other features and objects of the present invention and the manner of attaining them will become more apparent, and the invention itself will be best understood, by reference to the following description of one or more embodiments taken in conjunction with the accompanying drawings, wherein:

FIG. 5 provides a high-level illustration of components resident on each server with each subgroup of a super-cluster necessary to manage failover within the subgroup and within the super-cluster, according to one embodiment of the present invention;

Figure 1:
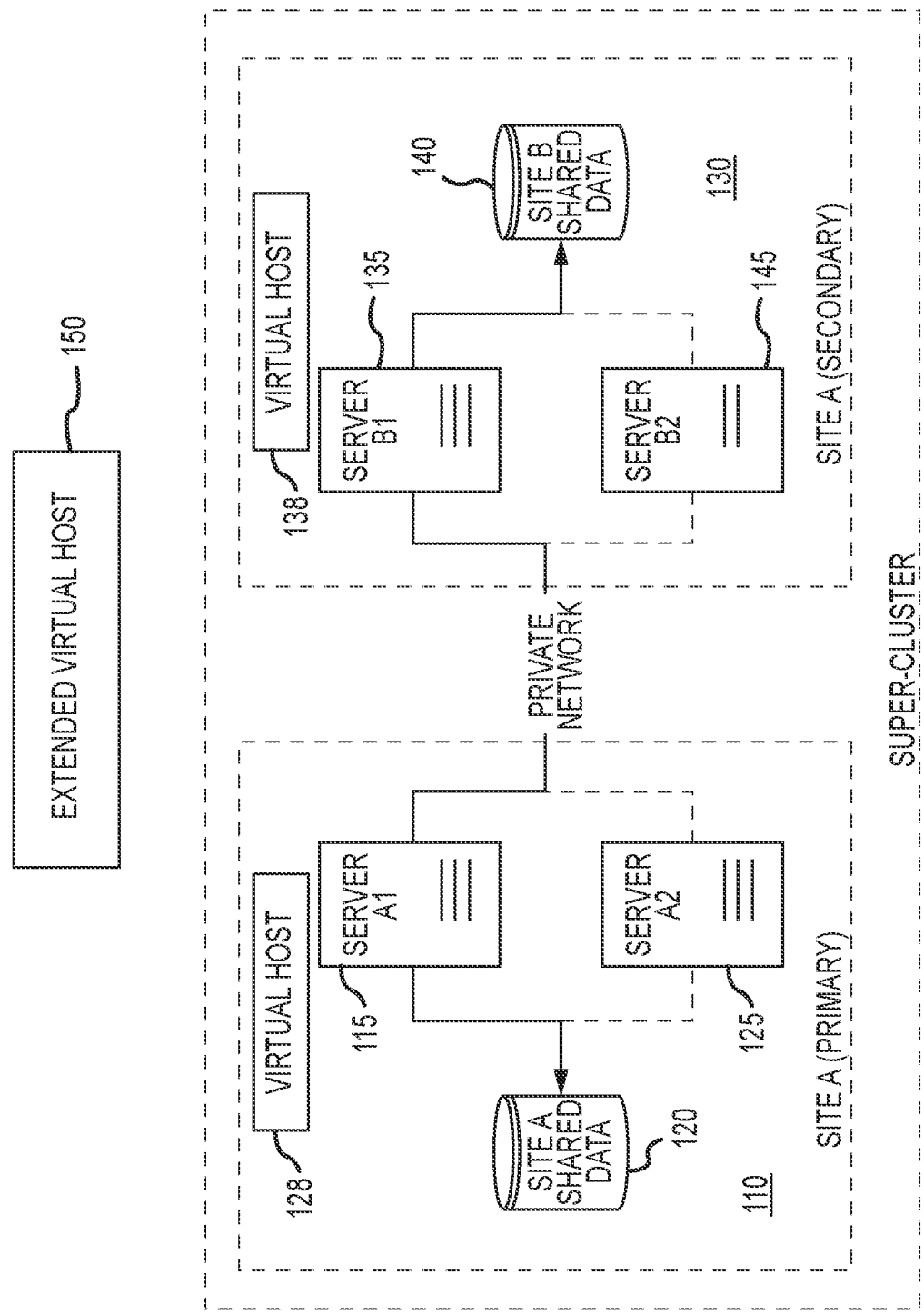
FIG. 1 presents two subgroups (Site A and Site B) of a super-cluster, according to one embodiment of the present invention.

The Figures depict embodiments of the present invention for purposes of illustration only. One skilled in the art will readily recognize from the following discussion that alternative embodiments of the structures and methods illustrated herein may be employed without departing from the principles of the invention described herein.

DESCRIPTION OF THE INVENTION

A logical super-cluster of server cluster subgroups provides site failover protection while maintaining local failover capability. One or more subgroups of servers are organized into server clusters wherein each subgroup includes one or more virtual hosts. Each subgroup's virtual host provides a logical container by which an application instantiation can operate. Upon a local server failure (virtual or physical) the virtual host and the application instantiation operating on top of that virtual host can easily move to another server at the site. An extended virtual host operates on top of the one or more subgroups of servers. Again, having a distinct IP address and forming a logical container for the application running on the primary node of the primary subgroup, the extended virtual host enables the active node of the extended virtual host to be reassigned to the secondary server subgroup upon failure of the primary server subgroup (site). The layered virtual host architecture provides for local and site failure while maintaining the advantages of local server cluster facilities.

Embodiments of the present invention are hereafter described in detail with reference to the accompanying Figures. Although the invention has been described and illustrated with a certain degree of particularity, it is understood that the present disclosure has been made only by way of example and that numerous changes in the combination and arrangement of parts can be resorted to by those skilled in the art without departing from the spirit and scope of the invention.

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Like numbers refer to like elements throughout. In the figures, the sizes of certain lines, layers, components, elements, or features may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. Thus, for example, reference to "a component surface" includes reference to one or more of such surfaces.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be also understood that when an element is referred to as being "on," "attached" to, "connected" to, "coupled" with, "contacting", "mounted" etc., another element, it can be directly on, attached to, connected to, coupled with, or contacting the other element or intervening elements may also be present. In contrast, when an element is referred to as being, for example, "directly on," "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of "over" and "under". The device may be otherwise oriented (rotated 90 degrees or at other orientations) and the spatially relative descriptors used herein interpreted accordingly. Similarly, the terms "upwardly," "downwardly," "vertical," "horizontal" and the like are used herein for the purpose of explanation only unless specifically indicated otherwise.

Included in the description are flowcharts depicting examples of the methodology which may be used to failover a server subgroup. In the following description, it will be understood that each block of the flowchart illustrations, and combinations of blocks in the flowchart illustrations, can be implemented by computer program instructions. These computer program instructions may be loaded onto a computer or other programmable apparatus to produce a machine such that the instructions that execute on the computer or other programmable apparatus create means for implementing the functions specified in the flowchart block or blocks. These computer program instructions may also be stored in a computer-readable memory that can direct a computer or other programmable apparatus to function in a particular manner such that the instructions stored in the computer-readable memory produce an article of manufacture including instruction means that implement the function specified in the flowchart block or blocks. The computer program instructions may also be loaded onto a computer or other programmable apparatus to cause a series of operational steps to be performed in the computer or on the other programmable apparatus to produce a computer implemented process such that the instructions that execute on the computer or other programmable apparatus provide steps for implementing the functions specified in the flowchart block or blocks.

Accordingly, blocks of the flowchart illustrations support combinations of means for performing the specified functions and combinations of steps for performing the specified functions. It will also be understood that each block of the flowchart illustrations, and combinations of blocks in the flowchart illustrations, can be implemented by special purpose hardware-based computer systems that perform the specified functions or steps, or combinations of special purpose hardware and computer instructions.

One or more embodiments of the present invention assembles a group of failover server clusters into a logical "super-cluster." A super-cluster is a logical cluster having subgroups as members much like a local server cluster has servers as failover members. The logical architecture and logical boundaries of the present invention do not necessarily map one-to-one to the physical or deployment architecture. In this instance, an active server of each cluster subgroup represents its subgroup in the super-cluster as a virtual host. In one embodiment, a subgroup is a logical container (virtual host) operating on top of a physical or virtual machines within the subgroup. As one of reasonable skill in the relevant art will appreciate, a virtual host is a logical instance isolated from its surroundings that operates on top of physical and virtual servers. A virtual host does not include an operating system. A virtual host is not a virtual machine yet it performs operating-system level virtualization. Each virtual host instantiates and is tied to at least one virtual IP address and upon failover the virtual host, including any container and application instantiation(s) associated with the virtual host, migrates from one server to another server along with the its virtual IP address(es). In the present application, a subgroup of servers is a virtual host operating under an extended virtual host (the super-cluster). When the subgroup (virtual host) fails its role migrates to another subgroup.

As described further herein, a host engine is responsible for establishing and maintaining the one or more virtual hosts and a unique virtual IP address associated with and tied to each virtual host. The host engine includes subprocesses of a virtual host manager which maintains and manages the virtual host and an internet address manager that creates and manages virtual IP addresses for each virtual host. Each virtual host operates on top of an operating system whether the operating system is part of a virtual machine or a physical server. Moreover, each virtual host instantiates, and is tied to, a unique virtual internet protocol (IP) address. On a selected node, one or more virtual host is formed by the host engine resident on that node to manage a subgroup. Along with the formation of the virtual host, a unique IP address is tied to each virtual host/subgroup. With respect to the present invention the term "failover group" and "subgroup" is the same as "virtual host". A virtual host is that logical entity operating on top of one or more physical and virtual servers. Moreover, the host engine resident on the node managing the subgroup can further establish an extended virtual host with the same characteristics. In another embodiment, a different host engine resident on a different server can establish and maintain a different extended virtual host with yet a different IP address.

Within a super-cluster, one subgroup (in a symmetrical model) is chosen as the primary subgroup and within that subgroup resides an active server. Monitoring and automated failover actions are applied to the super-cluster and to the subgroups as would be to servers in a cluster. When the primary subgroup completely fails, another subgroup will be automatically chosen as the new primary subgroup just as when a active server within a cluster (subgroup) fails over to a secondary server within the cluster. Accordingly, if only the active server in the subgroup fails and there are other servers within the subgroup on to which the active server can failover, a local failover occurs rather than a subgroup failover.

Servers belonging to a subgroup failover cluster are meant to replace each other, and usually have identical configurations. Subgroup members of a super-cluster may be intentionally unequal—each subgroup can have private shared storage and other resources assigned to it, which other subgroups may be unable to access directly. These resources can be accessed through the representative server of the subgroup, which is highly available and what replicates data of the primary subgroup on a local level. And, while described herein as a symmetrical cluster as one of reasonable skill in the relevant art will appreciate, an asymmetrical cluster organization is equally compatible with the present invention.

Consider the following example. FIG. 1 presents two subgroups (Site A 110 and Site B 130) showing a cluster subgroup failover operation according to one embodiment of the present invention. Each subgroup participating in a failover cluster can host two or more servers, virtual or physical, as well as a shared storage pool. In this instance the sites are connected by a private network, e.g. VPN, dark fiber or the like. The present invention can also utilize public networks such as the Internet. Recall the servers and subgroups may be distinguished logically as well as physically. Among the servers within site A 110 is an active server, A1 115, on which an application is instantiated and which assumes access to the site A shared storage 120. The active server, A1 115, also hosts the database engine. In a local failover scenario, other server(s), A2 125, remains, for the purpose of the application instantiated on the active server, in an inactive, standby state, and does not access the site A shared storage 120. If the active server, A1 115, fails, one of the inactive servers, A2 125, is reassigned as the active server, will thereafter assume access to the site A shared storage 120, and will maintain the application instance. As previously discussed, a virtual host 128, operating on top of the active server, A1 115, and instantiated with its own IP address independent of the IP address of the active server migrates, upon failure of server A1 115, to server A2 125. The application instantiation operates seamlessly on top of the virtual host. Accordingly, upon failover the virtual host and its IP address, along with the application instantiation role, migrates from the active server to the secondary server(s) without the application being disrupted.

Assume again in this instance server A1 115 is the active server on which the application is running in the subgroup at Site A 110. Data from the application is stored on Site A's shared data repository 120. Server A2 125, as described above, is a local failover backup for A1 115 and has access to the same shared data on site A 110 should it be needed. Site B 130 acts as a secondary subgroup should the entirety of site A 110 fail. Data stored on Site A shared data repository 120 is replicated on the Site B shared data store. Upon a failure of the entirety of Site A 110, the application resident on server A1 will failover to server B1 135 on site B 130. Server B1 135 on Site B 130 will then become the active server and Site B 130 will become the primary subgroup. A new secondary subgroup will be thereafter designated. Server B1 135 will assume the role of the active server within Site B 130 having access the site B shared data 140 with server B2 145 acting as a secondary server should server B1 135 locally fail. One skilled in the relevant art will recognize that while the present depiction shows only two subgroups, a super-cluster may include a plurality of subgroups and multiple super-clusters may exist having common subgroups and subgroup resources.

Figure 2A:
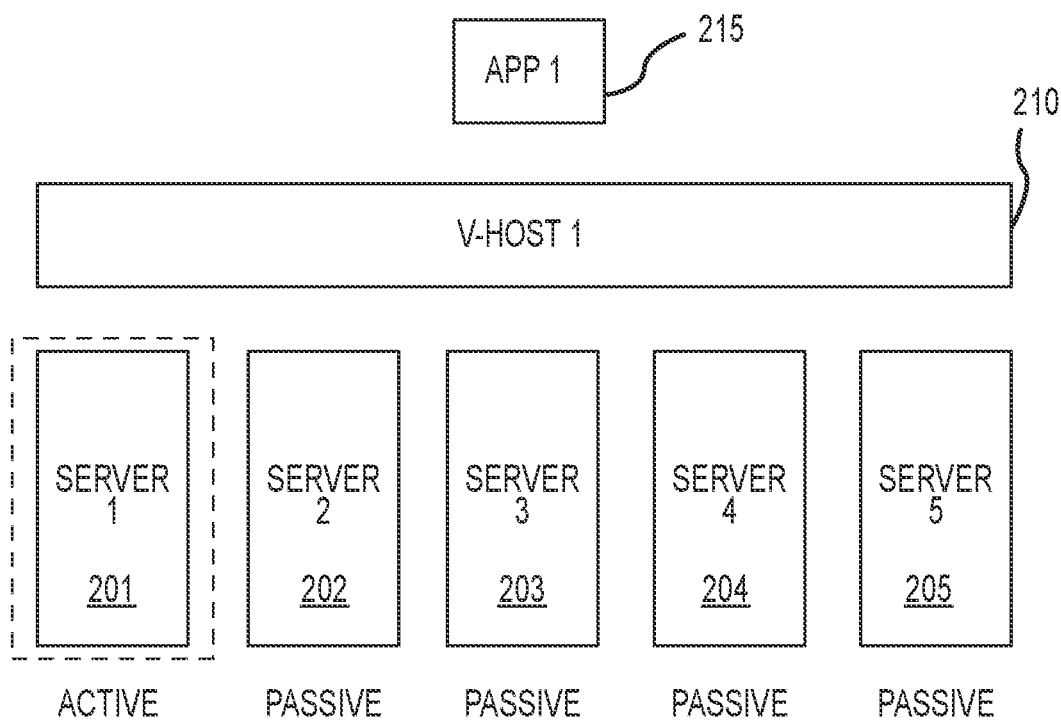
FIGS. 2A-2F present an example of local and subcluster failover according to one embodiment of the present invention.

To better understand the features of the present invention, and with reference to FIGS. 2A through 2E, recall that a virtual host is a logical container on which an application can be instantiated. Each server (physical or virtual) within a server cluster can be associated with one or more virtual hosts. For example, assume, as shown in FIG. 2A, server 1 201 is associated with virtual host 1 210 as the active server (designated by dashed line) on which an application is instantiated. The application 215 instantiated on server 1 201 runs on top of virtual host 1 210 which acts as a logical container. Servers 2-5, also associated with virtual host 1 210 in this local setting, are passive and serve as backups should a local failover occur.

Figure 2B:
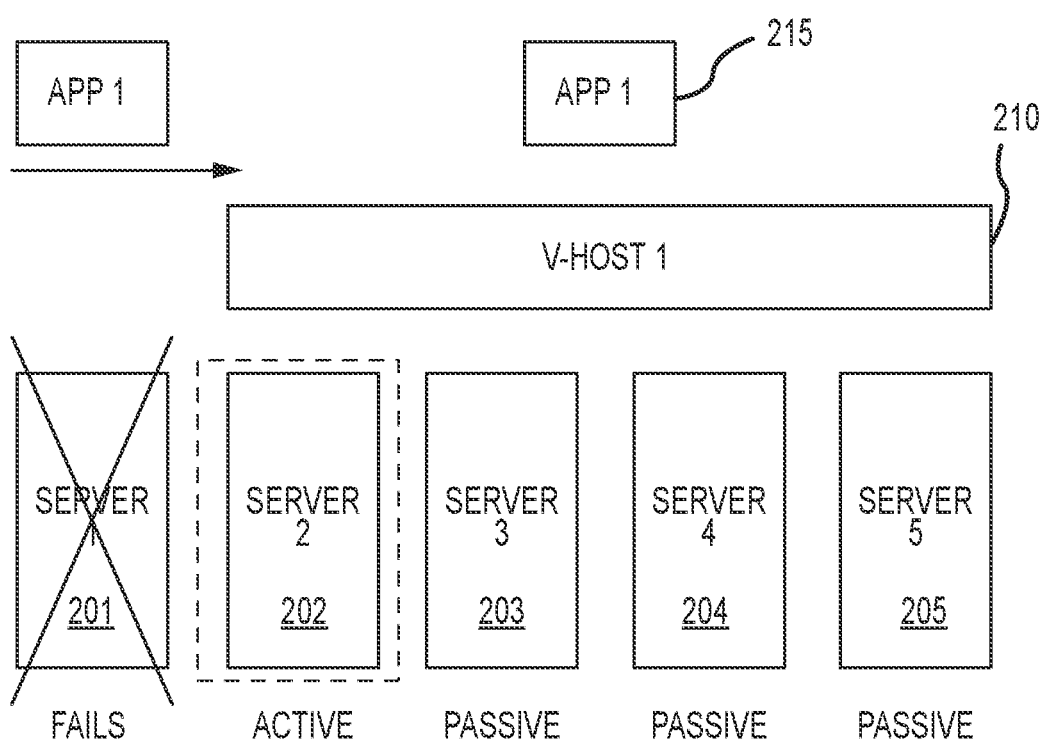

Upon failure of server 1 201, as shown in FIG. 2B, the virtual host 210 migrates the application 215 to server 2 202. Server 2 202 becomes the active server under virtual host 1 210. As the virtual host has access to all servers in the cluster, functional impact on the application is minimal.

Figure 2C:
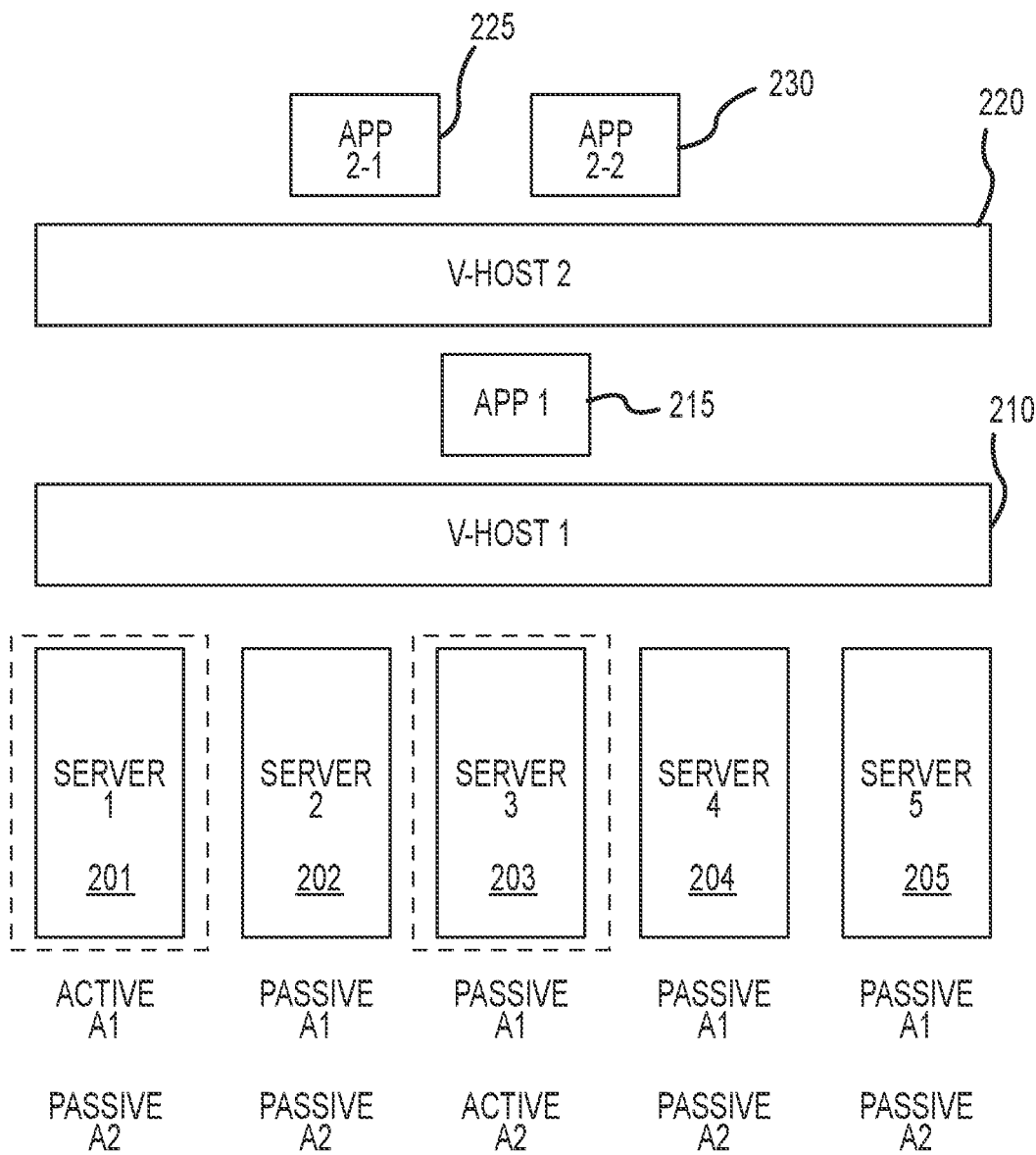

In the configuration shown in FIG. 2C, Server 1 201 remains associated (active) with virtual host 1 210 and application 1 215 while applications 2-1 and 2-2 are instantiated on top of virtual host 2 220 as associated (active) with server 3 203. Servers 2 202, 4 204 and 5 205 remain passive and available for failover of either server 1 201 or server 3 203. Each virtual host has an active node (identified by a dashed line) that monitors performance and underlying capability of the servers within the cluster. In this instance server 1 201 acts as the active node for virtual host 1 210 and server 3 203 is the active node for virtual host 2 220.

Figure 2D:
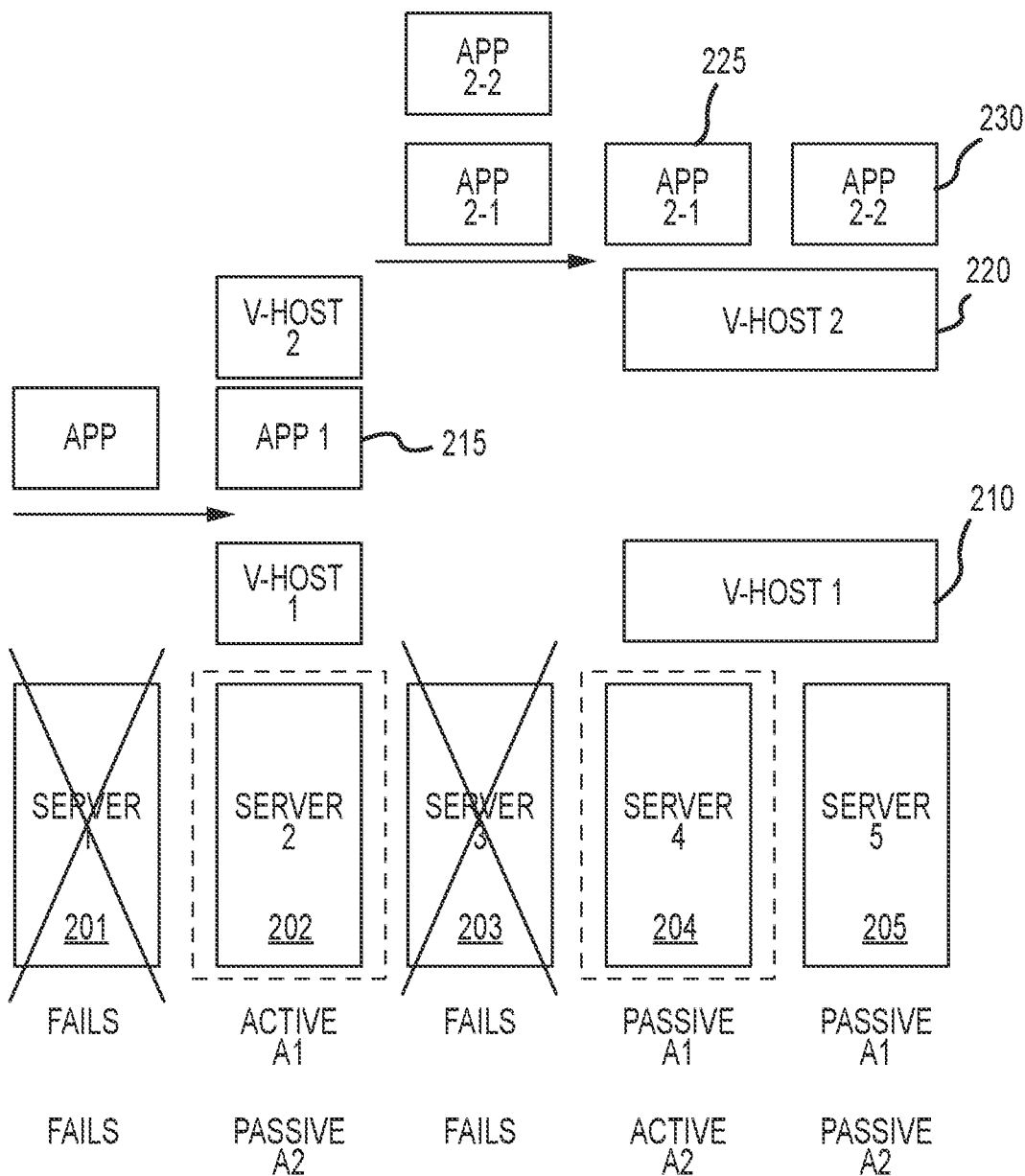

Should server 1 201 fail as shown in FIG. 2D, virtual host 1 210 migrates application 1's 215 role to a secondary server, server 2 202 as described herein. Server 2 202 becomes the active server for virtual host 1 210. At the same time virtual host 2 220 recognizes that server 3 203 is failing and must move applications 2-1 225 and 2-2 230. Virtual host 2 220 can migrate the roll of applications 2-2 225 and 2-3 230 to servers 4 204 or 5 205. In this example, virtual host 2 220 migrates the role of applications 2-1 225 and 2-2 230 to server 4 204, leaving server 5 205 passive. Server 4 204 becomes the active server for virtual host 2 220. In such an example a local failover protocol enables applications 1 215, 2-1 225 and 2-2 230 remain highly available. As each has access to a common data store (not shown), the migration would be seamless. However, it is possible, that the failure of one or more servers may cause the entire site to fail. Likewise, a common hardware or infrastructure failure may cause servers 1-5 to fail simultaneously. The present invention creates a new logical layer above one or more cluster subgroups shown in FIG. 2E. In essence an extended virtual host looks at each subgroup as a single node within its super-cluster, much like a virtual host within each subgroups looks at servers as nodes.

Figure 2E:
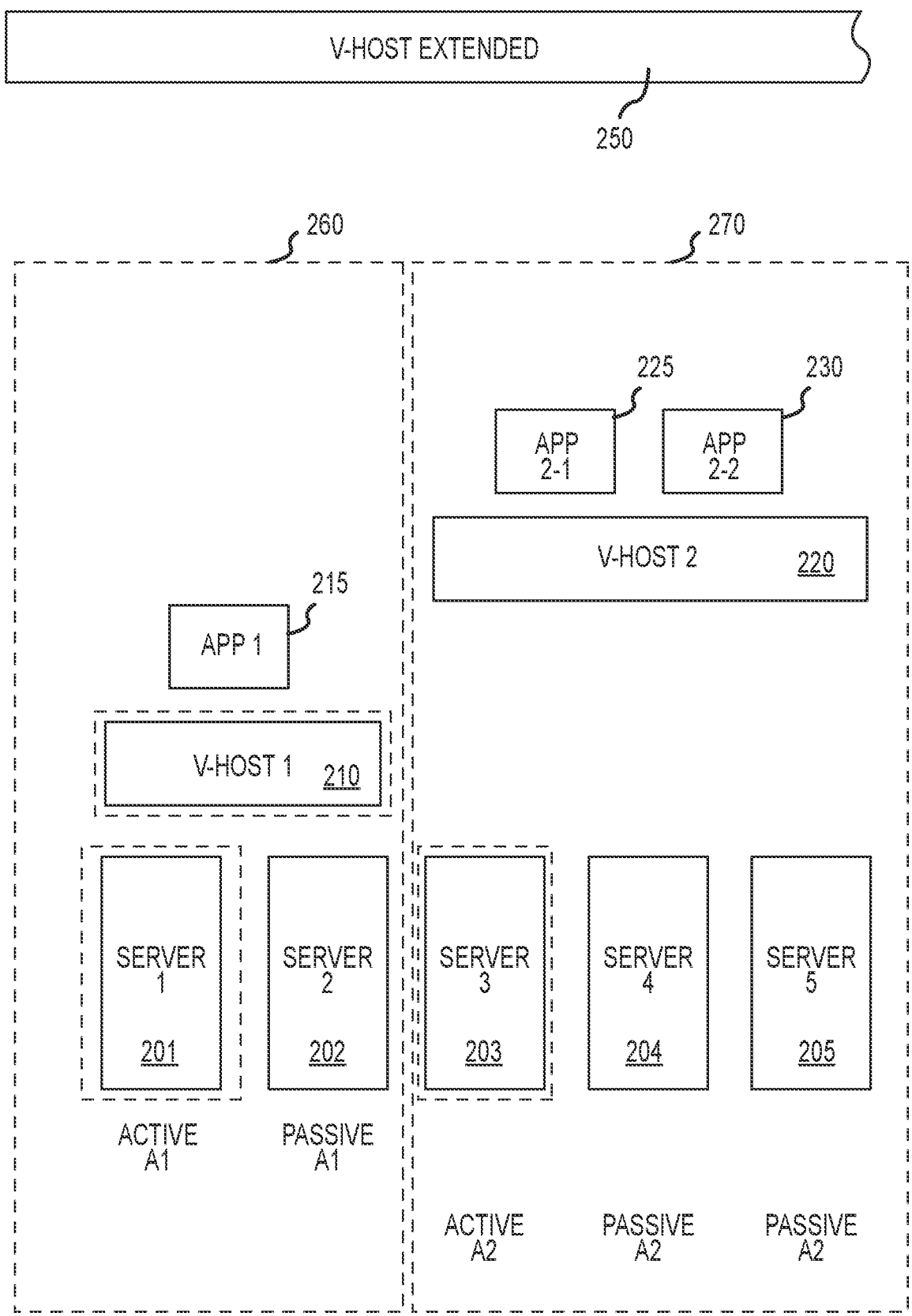
Figure 2F:
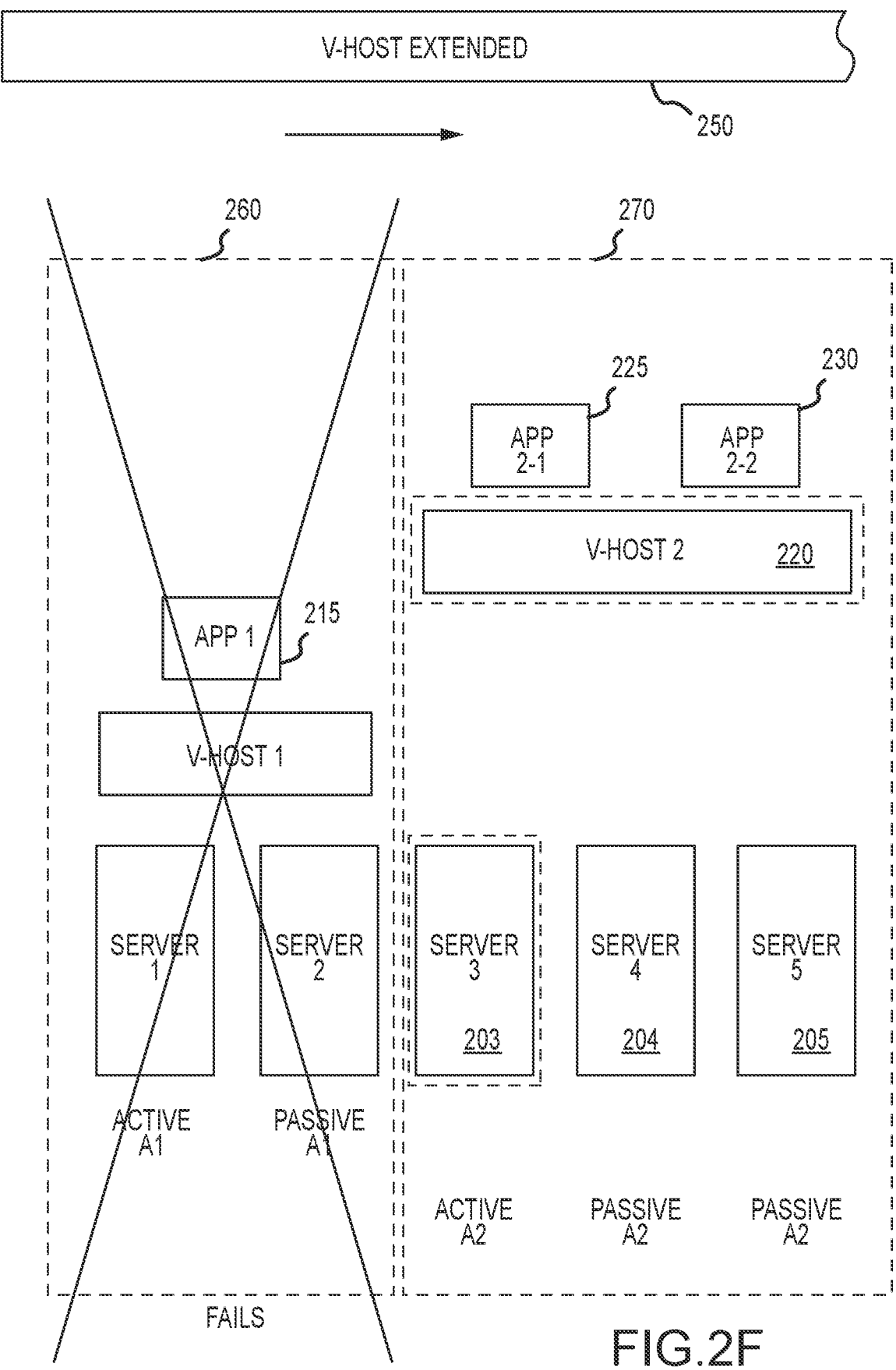

In one embodiment the entire cluster as a subgroup under the extended virtual host can be migrated to a new subgroup. Recall that a virtual host is a logical container meaning that resources associated with a subgroup can be managed logically. In one embodiment of the present invention servers 1-5 can be allocated as two subgroups. Assume for example, and as shown in FIG. 2E, that servers 1 201 and 2 202 reside in a different location than servers 3-5 or that they possess different configurations. The flexibility of the present invention enables an extended virtual host 250 to craft two nodes or form two subgroups from servers 1-5. Servers 1 201 and 2 202 form a first subgroup 260 and servers 3 203, 4 204 and 5 205 a second subgroup 270. Application 1 215 is instantiate on top of virtual host 1 210 in the first subgroup 260. Server 1 201 is the active server for virtual host 1 210. In a similar fashion virtual host 1 210 is the active subgroup for the extended virtual host 250. While with respect to the extended virtual host 250 subgroup two 270 is passive, it separately is locally active. In this instance applications 2-1 225 and 2-2 230 are instantiated on top of virtual host 2 220 using server 3 203 as the active server. Upon the failure of the first subgroup 260 the extended virtual host 250 is failed over to the second subgroup 270.

The failover of cluster subgroups operates in the same fashion as the failure of a server within a local cluster. According to one embodiment of the present invention, an extended virtual host treats each subcluster as a node within its "extended" cluster. One of the "nodes" is a primary node while the other "subgroups" fall into a passive role. In this case virtual host 1 is the primary "node" of the extended virtual host. As the subgroups are logical groups, the extended virtual host can allocate resources to each subgroup as necessary. And while under a single super-cluster resource allocation must be unique, a single resource can participate in multiple super-clusters. Subgroups of the same super-cluster cannot share members.

Upon failure of the first subgroup 260, virtual host 2 230 of the second subgroup 270 becomes the active "node" under the extended virtual host. Applications running on top of virtual host 2 220 adopt the role of application 1 215 as it migrates from the first subgroup 260 to the second subgroup 270.

Figure 3:
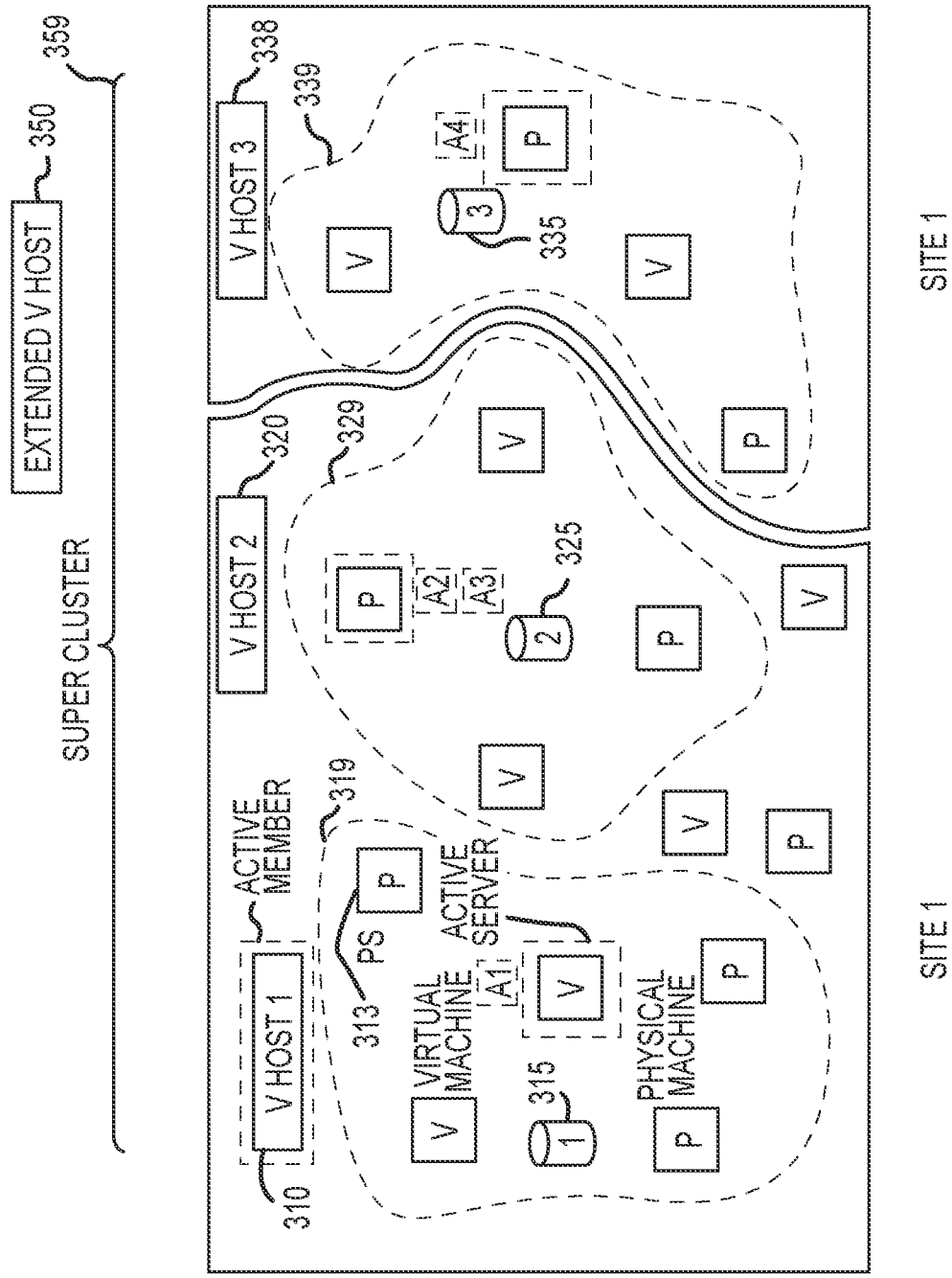
FIG. 3 shows a super-cluster of the present invention having three subclusters dispersed across two sites, according to one embodiment.
Figure 4:
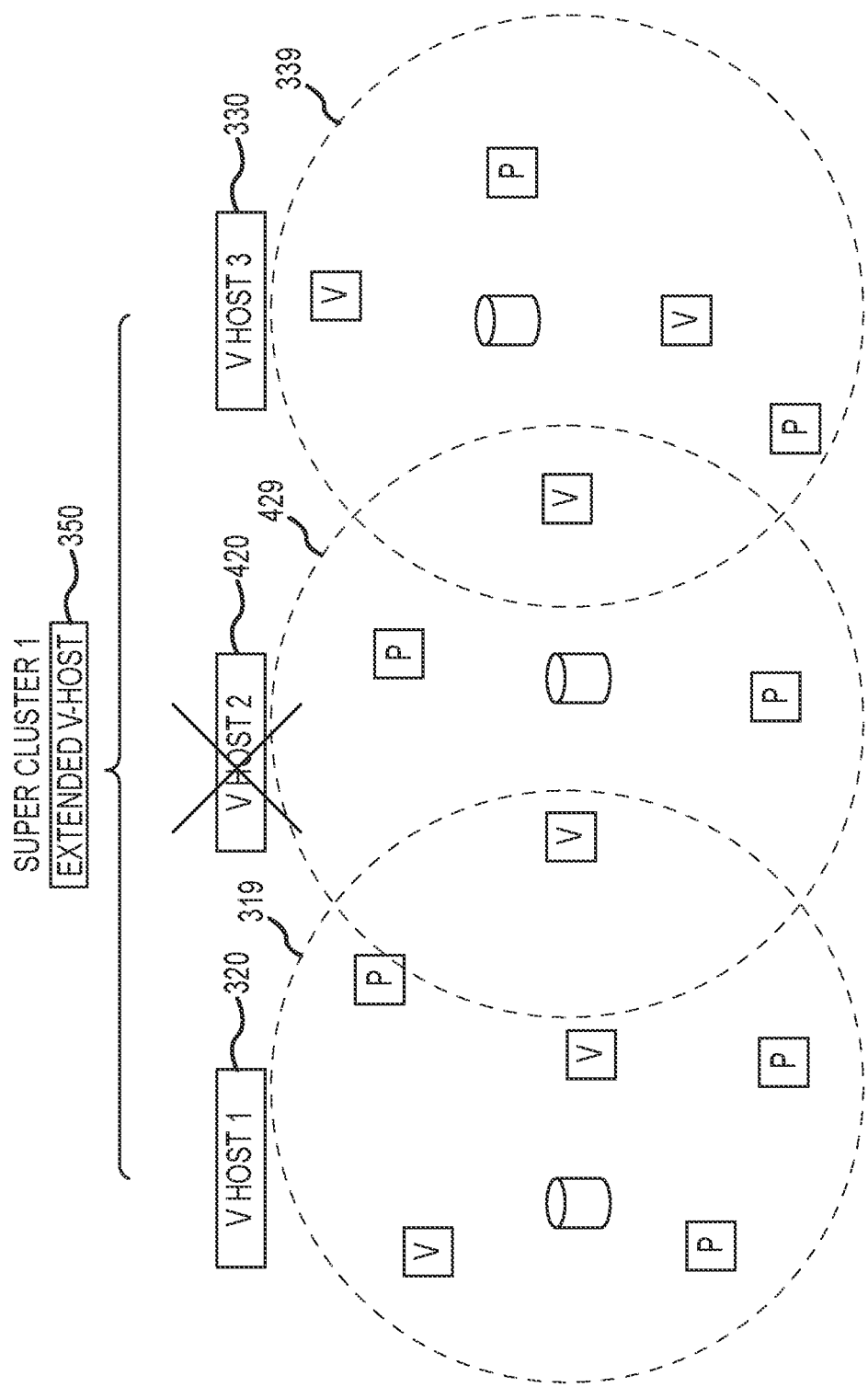
FIG. 4 illustrates resource sharing constraints in the configurations of servers and subgroups according to one embodiment of the present invention.

FIGS. 3 and 4 shows a plurality of nodes of a super-cluster organized into three subgroups under an extended virtual host. For the purposes of this example the combination of physical and virtual machines define virtual host 1 310, virtual host 2 320 and virtual host 3 330. Correspondingly virtual host 1, 2 and 3 define nodes under the extended virtual host 350 or super-cluster 359. As shown, the super-cluster 359 is configured to perform database replication between subgroups with the active member (node) of the super-cluster 310 acting as the primary member and the other members 320, 330 acting as secondary members that replicate data from the primary member.

In the example shown in FIG. 3, nodes, both physical and virtual, are grouped into three subgroups. Each subgroup is associated with a virtual host. Just as the active node within the subgroup maintains a failover or secondary node, the virtual host managing the primary subgroup identifies a secondary subgroup should the entirety of the primary subgroup fail. Assume for example subgroup 1 319, also known as virtual host 1 310, is the primary (active) subgroup of the super-cluster 359. Within subgroup 1 319, node Vp 311 (a virtual machine node) is designated as the active node of virtual host 1 310 on which an application, A1 312, is instantiated. One or more secondary nodes, Ps, 313 (physical machine within the same subgroup and at the same site) is designated as a local secondary server set to assume the application should Vp 312 fail. Data generated by node Vp 312 on subgroup 1 319 is stored on data store 1 315 and replicated on datastore 2 325 and data store 3 335. Just as the local monitor of Vp 311 watches processing to determine if Vp 311 should failover to Ps 313, virtual host 1 310 (through the active server) monitors the entirety of subgroup 1 319 as a logical node to determine if subgroup 1 319 is failing. In this instance, virtual host 1 310 is the active member for the extended virtual host 350. Assume subgroup 3 339, managed by virtual host 3 330, is the secondary subgroup and backup to subgroup 1 319. Should subgroup 1 319 fail, the extended virtual host 350 will failover subgroup 1 319 to subgroup 3 339. Subgroup 3 339 will become the primary subgroup and may, thereafter, identify subgroup 2 329 as the new secondary subgroup.

As mentioned, FIG. 3 shows three subgroups in which group is comprised of a unique set of nodes. From the perspective of the extended virtual host 350, there are but three nodes; subgroup 1 319 associated with virtual host 1 310, subgroup 2 329 associated with virtual host 2 320 and subgroup 3 339 associated with virtual host 3 330. FIG. 4 illustrates that a node may be a member of multiple subgroups. However, each subgroups in super-cluster must have a unique set of resources. Thus subgroup 2 329 of FIG. 4 cannot be a part of super-cluster 1 359 as shown but it could be a part of another super-cluster (not shown).

The present invention also ensures that for each site access to the data stored at the site, and the ability to replicate data to or from the site, is made highly available by having inactive standby servers at the site that are ready to take over if the active server fails. Yet, the setup also ensures that in the event of a total failure of the primary subgroup, another subgroup will be ready to become the primary member of the replication group with access to replicated data. Once a new primary subgroup is designated a new secondary subgroup is identified and replication of data to the new secondary subgroup is undertaken. In each instance a secondary subgroup can act as a primary subgroup operating a different application in a symmetric configuration. Thus, the resources in each subgroup are utilized yet provide for a high availability over a diverse network of not only servers but subgroups of servers.

With reference to FIG. 5, each server 501 with the subgroup includes components necessary to not only manage failover within the subgroup but also within the super-cluster. For example:

Cluster Monitor 510—responsible for establishing communication of all available servers participating in the replication group (subgroups)—including inactive servers, monitoring server availability, providing virtual synchrony through its coordinator, monitoring, and synchronizing the state of attached service processes (Cluster Services), relaying commands between Cluster Service members, and maintaining tunnel endpoints. To the Cluster Monitor, a Cluster Service is a separate software component participating in a named group. The Cluster Monitor informs all Cluster Services participating in the same group of each other's presence, and any changes that may occur to that group. The Local Monitor and Storage Monitor components function as Cluster Services.

Group Communication—establishing communication with all available servers involved in the cluster, monitoring server availability and communication channels, and electing a server as the cluster coordinator. This includes enumeration of available network interfaces, continuous monitoring of network path availability, and selection/failover of active network paths.

Pipe Router and State Machine—Provides reliable, in-order stream-oriented messaging channels, over the unreliable, out-of-order, datagram-oriented UDP communication channel. Manages pipe sockets, both listening sockets and outgoing connections. The communication channels provided by this module are used by Cluster Monitor components to communicate with other servers. The pipe state machine is like the TCP module found in most host networking stacks and performs largely the same function. However, the invention calls for a private TCP-like software component within the Cluster Monitor component.

DTLS session manager—responsible for establishing authenticated DTLS sessions with other servers in the cluster over UDP Cluster Service State Machine—monitoring availability of Cluster Services, processing changes to the set of available Cluster Services, and informing active Cluster Service components running on each system of the current service membership.

Command State Machine—monitoring the state of relay commands submitted by various Cluster Services. Ensuring consistent ordering of relayed commands, and the reliability of responses are sent back to the issuers of those commands.

Communication Settings Manager—maintains administratively configured details of the cluster, including the list of systems, their network addresses, and cryptographic secrets. Managing the process of adding and removing systems in an active cluster.

Local Monitor 520—The Local Monitor maintains configuration state for tunnels and provides an administrative interface. The local monitor manages failover within the subgroup recognizing when a server within the group fails and that other servers within the group can assume the assigned tasks. The local monitor also identifies that the entire group of servers within the cluster are failing and the subgroup must failover to another subgroup. The Local Monitor also manages the relationship of each subgroup within the super-cluster and which other subgroup is the primary/redundant subgroup if a group failover occurs.

Client Manager—handling incoming client requests, passing the requests to the Application Coordinator, and maintaining client connections.

Sync Manager—maintaining administrative configuration of tunnels. Synchronizing configuration between systems as cluster membership changes.

Application Coordinator—executing administrative commands, and upholding cluster state invariants. This includes administrative reconfiguration, as well as ensuring that each site has an active server, that one site is designated as the primary, and that all other sites are secondaries replicating data from the primary.

Storage Monitor 530—The Storage Monitor is responsible for monitoring and configuring storage devices 535 that are available to the local server, especially shared storage devices.

Device Enumerator—maintains a list of disk and volume devices present on the local system, and actively monitors changes to that list.

Sync Manager—maintains administrative configuration of known, managed disk devices. Synchronizes configuration between systems as cluster membership changes.

Storage Coordinator—executes cluster-wide administrative commands and maintains cluster invariants related to storage devices. For example, if the user requests a volume to be created, the Storage Coordinator will determine the best system on which to create the volume, ensure that the target disk devices are made available on that system, and then forward the request to that system.

Fencing—blocks access to storage devices for systems that may have previously had access to them, but are no longer part of the active cluster, possibly due to loss of network communication.

Device Administration—executes device reconfiguration requests, including setting them online or offline, and creating/deleting/extending/shrinking file system volumes.

DxGUI/DxCLI/DxMobi Client Software 570—User interface software for inspecting and reconfiguring the applications, cluster, and tunnels.

Data Management Application 560—the application that manages the data store. This application is responsible for storing and retrieving data from the shared storage device. It is also responsible for replicating the data across sites as the data changes, and assuming the primary and secondary roles as required.

The example data management application is Microsoft SQL Server. The data management application must necessarily communicate with its counterparts running on other servers.

Host Engine 540—the group of servers on each site is internally represented as a "virtual host," and this component is responsible for establishing and maintaining virtual hosts and virtual IP addresses. It is invoked by the Local Monitor to handle specific requests and exits when finished. Its duties include:

Virtual Host Manager—maintain and manage virtual host list

Internet Address Manager—handles binding and unbinding of virtual IP addresses

Application Engine 550—responsible for starting, stopping, and managing configuration of the data management application. It is invoked by the Local Monitor to handle specific requests and exits when finished. Its duties include:

Database Manager—maintain and manage database files per instance

Registry Manager—maintaining and manage registry values for the virtualized instance Instance Manager—maintain and manage instance configuration stored on disk Integration Manager—handling instance registration with Registry and Health Monitor Health Monitor 580—responsible for monitoring application health and signaling a failover or failback event. It runs as a system service daemon, listening on a named pipe for remote procedure requests. Its duties include:

Performance Monitor—monitor CPU, memory, and I/O utilization of the system and the relevant application processes Service Watcher—monitoring service health and raising events based on registration policy Alert Action Processor—sends emails and invokes scripts in response to alerts and application conditions The present invention logically groups servers at a particular site, subgroup, as a virtual host. The virtual host has a site-local IP address associated with it, and that IP address is bound to the active server of the virtual host. The virtual host also has site-local shared disks associated with it, and the disks are assigned to and mounted on the active server, for use by the data management application. The Cluster Monitor ensures that the active server is available while the Health Monitor ensures that the data management application is functional, and the Storage Monitor ensures that the disks are available. When any of these components detects a failure, the Application Coordinator restarts the virtual host on an inactive server.

One aspect of the invention is the ability to group together the virtual hosts set up for each site into an extended virtual host/"super-cluster." The extended virtual host has underlying virtual hosts as member nodes and directs data replication from its primary member to its secondary members. When the primary virtual host within the extended virtual host has completely failed and cannot be restarted, the Application Coordinator will attempt to fail over the subgroup and promote one of its secondary subgroups to primary.

Virtual host members of an extended virtual host that are configured as secondaries direct their data management applications configured to replicate data from the primary subgroup. These applications write to their site-local data stores, but only to replicate changes made on the primary. They are not, in one embodiment, allowed to make original modifications to the data store. The present invention also sets up automated shared storage with cluster site-to-site failover.

The logical super-cluster of server cluster subgroups of the present invention provides site failover protection while maintaining local failover capability. Subgroups of servers are organized into server clusters as a virtual host. Each subgroup's virtual host provides a logical container by which an application instantiation can operate. Upon a local server failure (virtual or physical) the virtual host and the application instantiation operating on top of that virtual host can easily move to another server at the site. An extended virtual host operates on top of the one or more subgroups of servers. Again, having a distinct IP address and forming a logical container for the application running on the primary node of the primary subgroup, the extended virtual host enables the application instantiation to move from subgroup to subgroup upon failure of the primary server subgroup (site). The layered virtual host architecture provides for local and site failure while maintaining the advantages of local server cluster facilities.

Figure 6A:
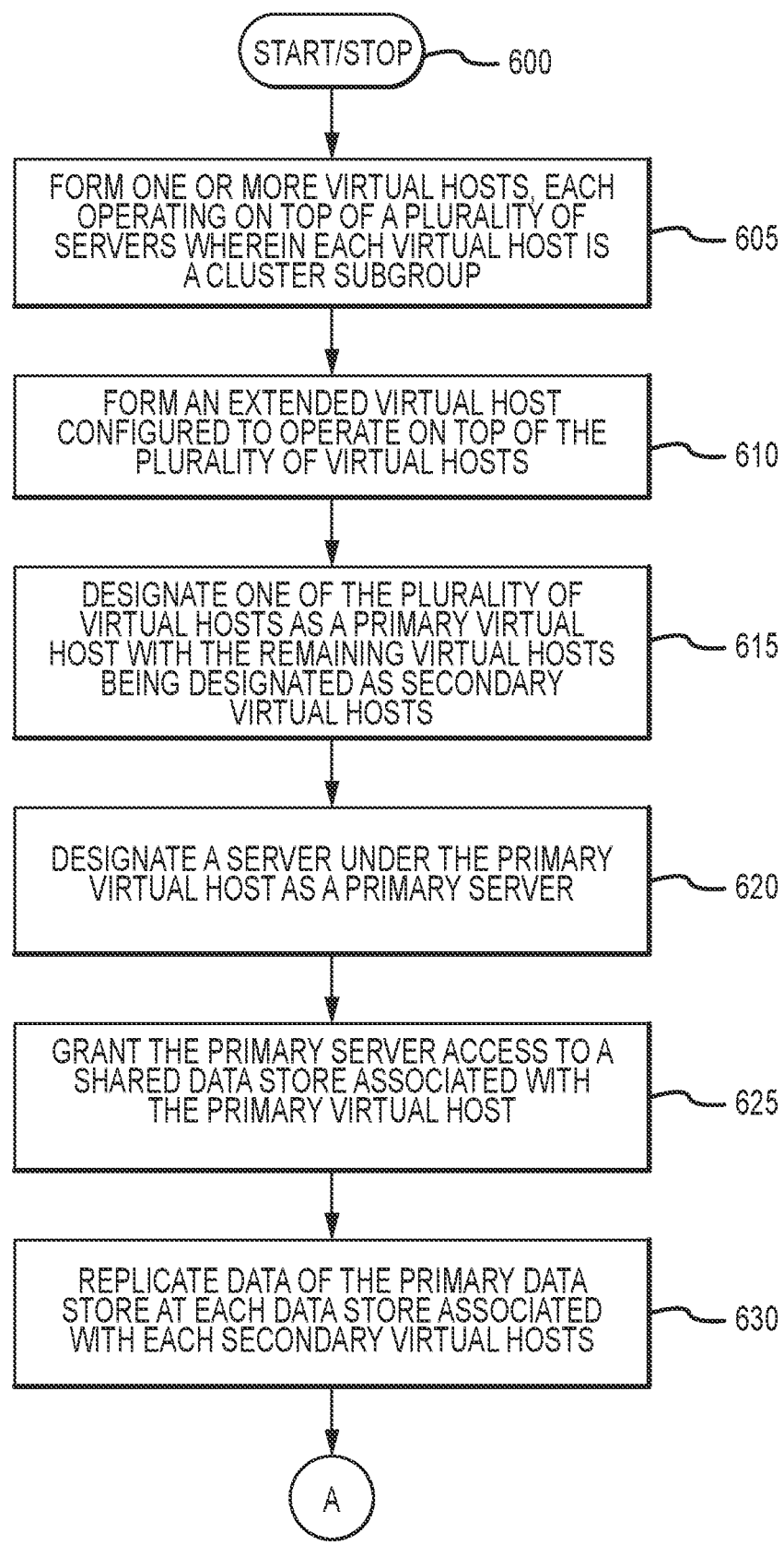
FIGS. 6A to 6C are flowcharts for one methodology of subgroup failover within a logical super-cluster according to one embodiment of the present invention.
Figure 6B:
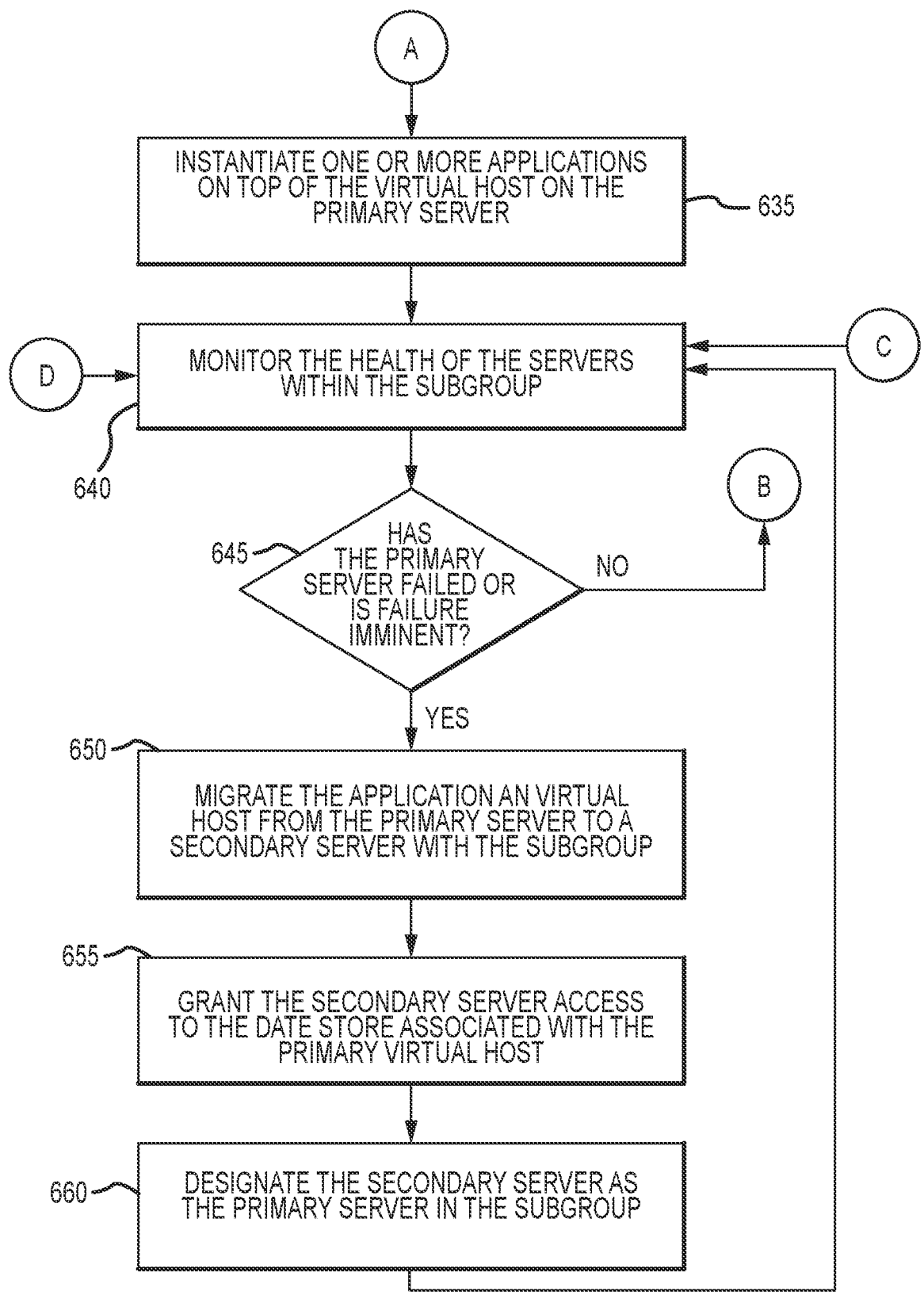
Figure 6C:
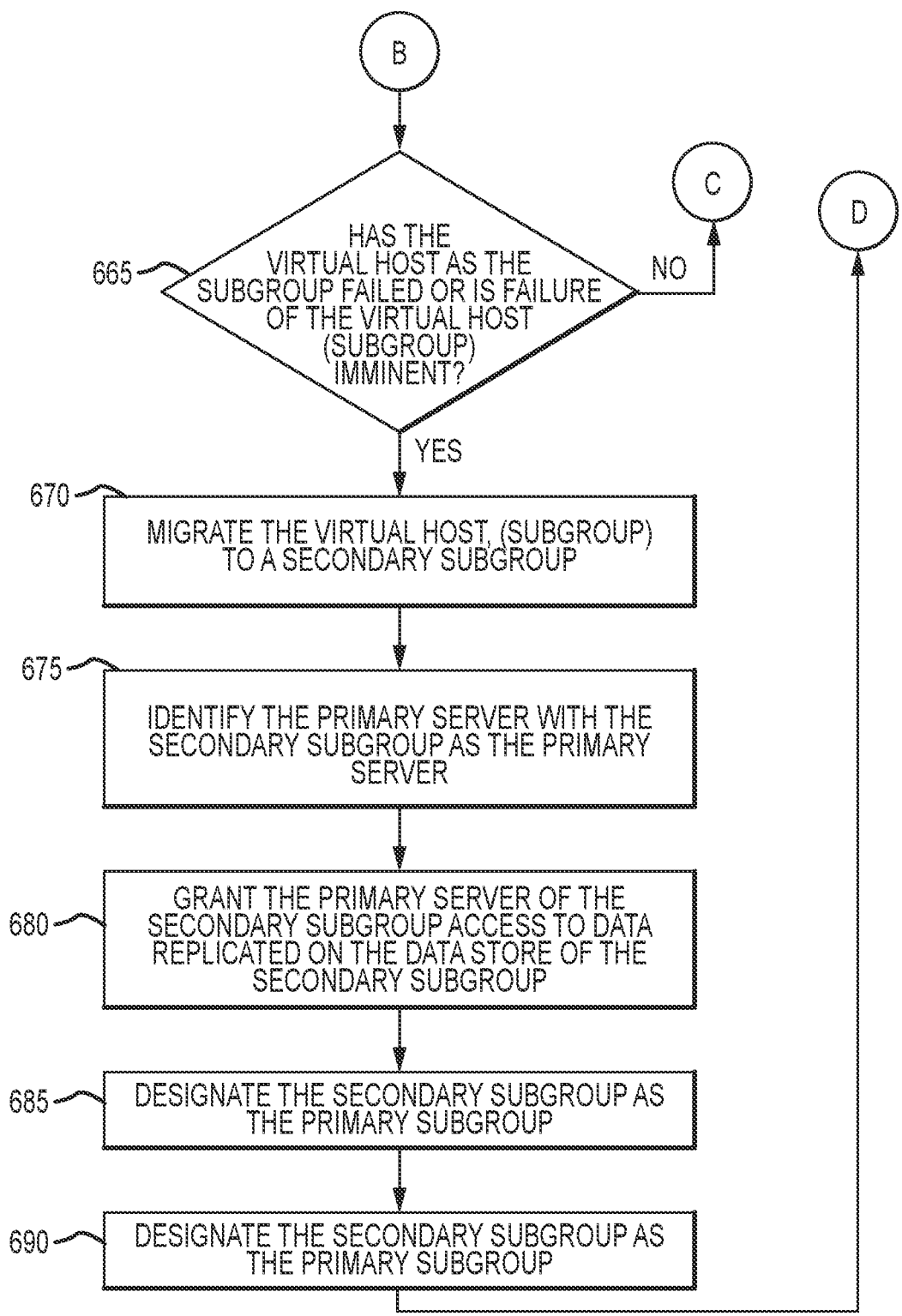

One super-cluster failover methodology, according to the present invention, is presented in FIG. 6. Subgroup failover begins 605 with formation of one or more virtual host operating on top of a plurality of servers. In each instance, the servers under the virtual host may be virtual and/or physical machines. Moreover, in each instance the virtual host possesses an IP address unique from the IP of the underlying machine on which it operates. An extended virtual host 610 is formed on top of the one or more subgroups (subgroup virtual hosts). One of the subgroups is designated 615 as a primary subgroup within which is a primary common data store and a primary serer 620. As the applications run 635 within the subgroup operates, data is exchanged and stored 625 on the primary data store. Simultaneously, data from the primary data store is replicated 630 on data stores present on the other, passive subgroups.

Responsive 645 to failure or impending failure 640 (the health of each server is monitored) of a server within a particular subgroup, the subgroup virtual host migrates 650 the application instantiated on that server to a secondary or backup server (now designated 660 as the primary server) within the subgroup. Data access to the primary data is store is shifted 655 from the failed server to the new server. However, responsive 665 to failure or impending failure of the entirety of the subgroup the extended virtual host migrates 670 the underlying virtual host and any application roles instantiations to an entirely different subgroup. The secondary subgroup is redesignated 685 as the primary subgroup; with a primary server 675, and is granted access 680 to the data replicated on its data store. Now, as the primary subgroup, data is exchanged with its data store and replicated to the other passive subgroups. Lastly a new secondary subgroup is identified 690.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

It will also be understood by those familiar with the art, that the invention may be embodied in other specific forms without departing from the spirit or essential characteristics thereof. Likewise, the naming and division of the modules, managers, functions, systems, engines, layers, features, attributes, methodologies, and other aspects are not mandatory or significant, and the mechanisms that implement the invention or its features may have different names, divisions, and/or formats. Furthermore, as will be apparent to one of ordinary skill in the relevant art, the modules, managers, functions, systems, engines, layers, features, attributes, methodologies, and other aspects of the invention can be implemented as software, hardware, firmware, or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Accordingly, the disclosure of the present invention is intended to be illustrative, but not limiting, of the scope of the invention.

In a preferred embodiment, the present invention can be implemented in software. Software programming code (instructions) which embodies the present invention is typically accessed by a microprocessor from long-term, persistent storage media of some type, such as a flash drive or hard drive. The software programming code may be embodied on any of a variety of known media for use with a data processing system, such as a diskette, hard drive, CD-ROM, or the like. The code may be distributed on such media, or may be distributed from the memory or storage of one computer system over a network of some type to other computer systems for use by such other systems. Alternatively, the programming code may be embodied in the memory of the device and accessed by a microprocessor using an internal bus. The techniques and methods for embodying software programming code in memory, on physical media, and/or distributing software code via networks are well known and will not be further discussed herein.

Generally, program modules include routines, programs, objects, components, data structures and the like that perform tasks or implement particular abstract data types. Moreover, those skilled in the art will appreciate that the invention can be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be in both local and remote memory storage devices.

Figure 7:
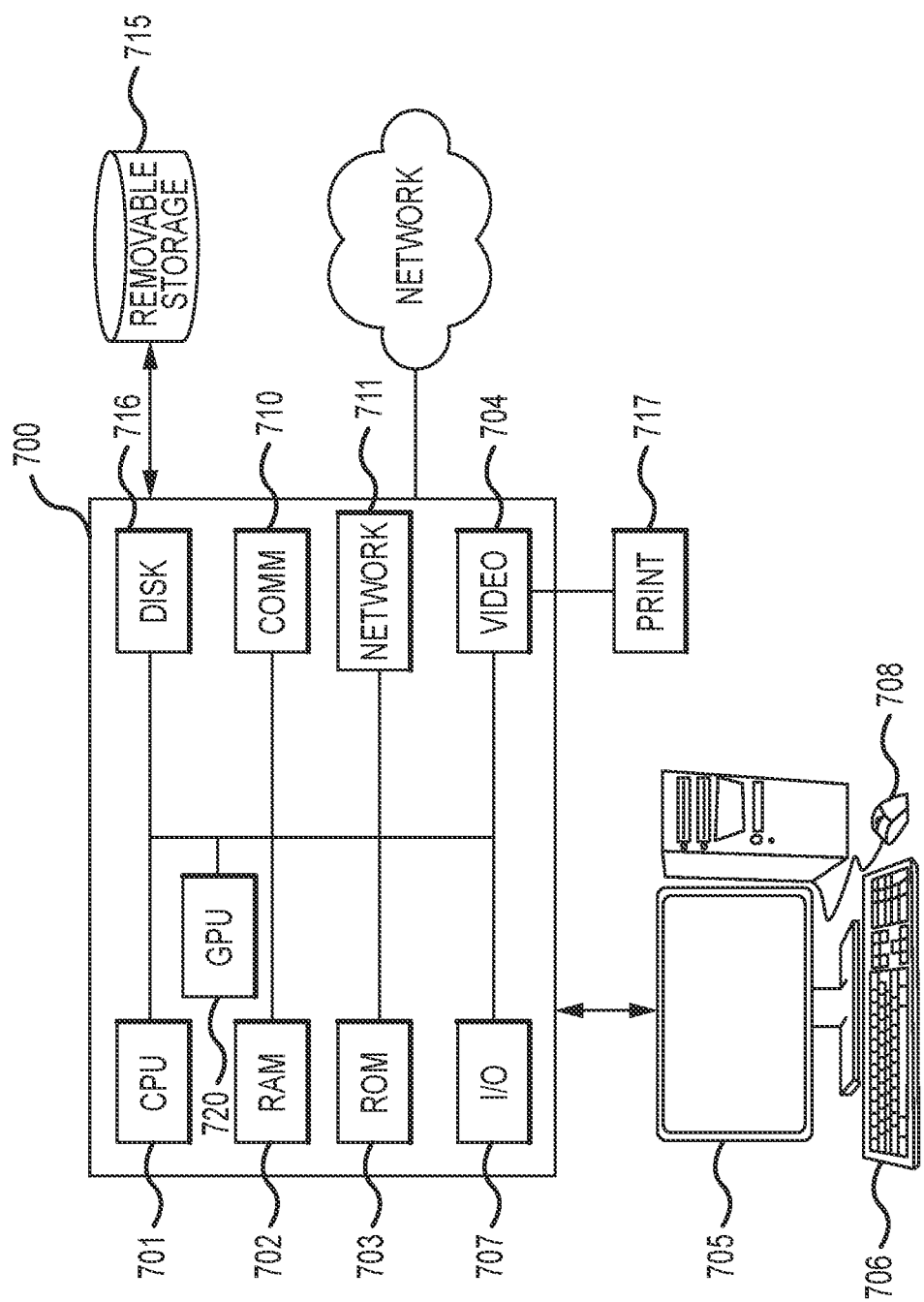
FIG. 7 is a high level block diagram of components found in a computing device suitable for implementing one or more embodiments of the present invention.

One of reasonable skill will also recognize that portions of the present invention may be implemented on a conventional or general-purpose computing system, such as a personal computer (PC), server, a laptop computer, a notebook computer, or the like. FIG. 7 is a very general block diagram of a computer system in which software-implemented processes of the present invention may be embodied. As shown, system 700 comprises a central processing unit(s) (CPU) or processor(s) 701 coupled to a random-access memory (RAM) 702, a graphics processor unit(s) (GPU) 720, a read-only memory (ROM) 703, a keyboard or user interface 706, a display or video adapter 704 connected to a display device 705, a removable (mass) storage device 715 (e.g., floppy disk, CD-ROM, CD-R, CD-RW, DVD, or the like), a fixed (mass) storage device 716 (e.g., hard disk), a communication (COMM) port(s) or interface(s) 710, and a network interface card (NIC) or controller 711 (e.g., Ethernet, WIFI). Although not shown separately, a real time system clock is included with the system 700, in a conventional manner.

CPU 701 comprises a suitable processor for implementing the present invention. The CPU 701 communicates with other components of the system via a bi-directional system bus 720 (including any necessary input/output (I/O) controller 707 circuitry and other "glue" logic). The bus, which includes address lines for addressing system memory, provides data transfer between and among the various components. Random-access memory 702 serves as the working memory for the CPU 701. The read-only memory (ROM) 703 contains the basic input/output system code (BIOS)—a set of low-level routines in the ROM that application programs and the operating systems can use to interact with the hardware, including reading characters from the keyboard, outputting characters to printers, and so forth.

Mass storage devices 715, 716 provide persistent storage on fixed and removable media, such as magnetic, optical, or magnetic-optical storage systems, flash memory, or any other available mass storage technology. The mass storage may be shared on a network, or it may be a dedicated mass storage. As shown in FIG. 7, fixed storage 716 stores a body of program and data for directing operation of the computer system, including an operating system, user application programs, driver, and other support files, as well as other data files of all sorts. Typically, the fixed storage 716 serves as the main hard disk for the system.

In basic operation, program logic (including that which implements methodology of the present invention described below) is loaded from the removable storage 715 or fixed storage 716 into the main (RAM) memory 702, for execution by the CPU 701. During operation of the program logic, the system 700 accepts user input from a keyboard and pointing device 706, as well as speech-based input from a voice recognition system (not shown). The user interface 706 permits selection of application programs, entry of keyboard-based input or data, and selection and manipulation of individual data objects displayed on the screen or display device 705. Likewise, the pointing device 708, such as a mouse, track ball, pen device, or the like, permits selection and manipulation of objects on the display device. In this manner, these input devices support manual user input for any process running on the system.

The computer system 700 displays text and/or graphic images and other data on the display device 705. The video adapter 704, which is interposed between the display 705 and the system's bus, drives the display device 705. The video adapter 704, which includes video memory accessible to the CPU 701, provides circuitry that converts pixel data stored in the video memory to a raster signal suitable for use by a cathode ray tube (CRT) raster or liquid crystal display (LCD) monitor. A hard copy of the displayed information, or other information within the system 700, may be obtained from the printer 717, or other output device.

The system itself communicates with other devices (e.g., other computers) via the network interface card (NIC) 711 connected to a network (e.g., Ethernet network, Bluetooth wireless network, or the like). The system 700 may also communicate with local occasionally connected devices (e.g., serial cable-linked devices) via the communication (COMM) interface 710, which may include a RS-232 serial port, a Universal Serial Bus (USB) interface, or the like. Devices that will be commonly connected locally to the interface 710 include laptop computers, handheld organizers, digital cameras, and the like.

Embodiments of the present invention as have been herein described may be implemented with reference to various wireless networks and their associated communication devices. Networks can also include mainframe computers or servers, such as a gateway computer or application server (which may access a data repository). A gateway computer serves as a point of entry into each network. The gateway may be coupled to another network by means of a communications link. The gateway may also be directly coupled to one or more devices using a communications link. Further, the gateway may be indirectly coupled to one or more devices. The gateway computer may also be coupled to a storage device such as data repository.

While there have been described above the principles of the present invention in conjunction with a system and method for hierarchical failover groups it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features that are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The Applicant hereby reserves the right to formulate new claims to such features and/or combinations of such features during the prosecution of the present application or of any further application derived therefrom.

The invention claimed is:

1. A system for high server cluster availability, comprising;
    a plurality of computing devices communicatively connected via a network wherein at least one of the computing devices includes instructions stored on a storage medium and a processor to execute the instructions to form a virtual computing device and wherein the plurality of computing devices and the virtual computing device are a plurality of servers, the plurality of servers having one or more virtual hosts configured to operate on top of the plurality of servers as a logical instance container free of an operating system and wherein each one of the one or more virtual hosts is tied to at least one virtual internet protocol address distinct from the internet protocol address of one of the plurality of servers on which it operates;
    an extended virtual host configured to operate on top of the one or more virtual hosts wherein the extended virtual host instantiates and is tied to at least one virtual internet protocol address distinct from the internet protocol address of each virtual host; and
    at least one instantiation of an application role configured to operate on top of one of the one or more virtual hosts wherein responsive to failover of one of the one or more virtual hosts, the extended virtual host is operable to select a different virtual host of the one or more virtual hosts and a new primary server, and transfer its virtual internet protocol address and the application role to the new primary server of that virtual host.

2. The system for high server cluster availability according to claim 1, wherein each server under the one or more virtual hosts includes an internet protocol address, a local monitor engine, a cluster monitor engine, a host engine, and an application engine.

3. The system for high server cluster availability according to claim 2, responsive to failover of a server under one of the one or more virtual hosts the host engine of that server is operable to transfer its virtual internet protocol address and the instantiation of the application from that server under the one of the one or more virtual hosts to another server under the one of the one or more virtual hosts.

4. The system for high server cluster availability according to claim 1, wherein the one or more virtual hosts are each logical members of the extended virtual host.

5. The system for high server cluster availability according to claim 1, wherein the extended virtual host recognizes each of the one or more virtual hosts as single nodes.

6. The system for high server cluster availability according to claim 1, wherein one of the one or more virtual hosts is an active virtual host and under the active virtual host resides an active server.

7. The system for high server cluster availability according to claim 6, wherein each active virtual host under the extended virtual host is comprised of a unique set of servers.

8. The system for high server cluster availability according to claim 1, wherein a server may be a member of another virtual host under another extended virtual host.

9. The system for high server cluster availability according to claim 1, further comprising, for each virtual host, a data store configured to store data and wherein data is replicated across each virtual host under the extended virtual host.

10. The system for high server cluster availability according to claim 1, wherein, for each application instantiation, one virtual host acts as a primary virtual host under the extended virtual host.

11. A method for high server cluster availability, comprising:
    forming one or more virtual hosts wherein each virtual host operates on top of a plurality of servers, the plurality of servers comprised of a plurality of computing devices communicatively connected via a network wherein at least one of the computing devices includes instructions stored on a storage medium and a processor to execute the instructions to form a virtual computing device and wherein each of the one or more virtual hosts operates as a logical instance container free of an operating system and wherein each one of the one or more virtual hosts is tied to at least one virtual internet protocol address distinct from the internet protocol address of one of the plurality of servers on which it operates;
    operating an extended virtual host on top of the one or more virtual hosts wherein the extended virtual host instantiates and is tied to at least one virtual internet protocol address distinct from the internet protocol address of each virtual host; and
    operating at least one instantiation of an application role on top of one of the one or more virtual hosts wherein responsive to failover of one of the one or more virtual hosts, the extended virtual host selects a different virtual host of the one or more virtual hosts as a new primary server, and transfers its virtual internet protocol address and the application role to the new primary server of that virtual host.

12. The method for high server cluster availability according to claim 11, wherein each server under the one or more virtual hosts includes an internet protocol address, a local monitor engine, a cluster monitor engine, a host engine, and an application engine.

13. The method for high server cluster availability according to claim 12, responsive to failover of a server under one of the one or more virtual hosts, further comprising transferring by the host engine of that server its virtual internet protocol address and the instantiation of the application from that server under the one of the one or more virtual hosts to another server under the one of the one or more virtual hosts.

14. The method for high server cluster availability according to claim 11, wherein the one or more virtual hosts are each logical members of the extended virtual host.

15. The method for high server cluster availability according to claim 11, wherein the extended virtual host recognizes each of the one or more virtual hosts as single nodes.

16. The method for high server cluster availability according to claim 11, wherein one of the one or more virtual hosts is an active virtual host and under the active virtual host resides an active server.

17. The method for high server cluster availability according to claim 16, wherein each active virtual host under the extended virtual host is comprised of a unique set of servers.

18. The method for high server cluster availability according to claim 11, wherein a server may be a member of another virtual host under another extended virtual host.

19. The method for high server cluster availability according to claim 11, further comprising replicating, for each virtual host, data across each virtual host under the extended virtual host.

20. The method for high server cluster availability according to claim 11, further comprising acting, for each application instantiation one by virtual host, as a primary virtual host under the extended virtual host.

* * * * *